(12) United States Patent
Wagner et al.

(10) Patent No.: US 12,321,766 B2
(45) Date of Patent: *Jun. 3, 2025

(54) LOW LATENCY COMPUTATIONAL CAPACITY PROVISIONING

(71) Applicant: Amazon Technologies, Inc., Seattle, WA (US)

(72) Inventors: Timothy Allen Wagner, Seattle, WA (US); Dylan Chandler Thomas, Seattle, WA (US); Sean Philip Reque, Everett, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/578,342

(22) Filed: Jan. 18, 2022

(65) Prior Publication Data

US 2022/0391238 A1 Dec. 8, 2022

Related U.S. Application Data

(63) Continuation of application No. 16/165,492, filed on Oct. 19, 2018, now Pat. No. 11,263,034, which is a
(Continued)

(51) Int. Cl.
*G06F 9/455* (2018.01)
*G06F 9/4401* (2018.01)
(Continued)

(52) U.S. Cl.
CPC ...... *G06F 9/45533* (2013.01); *G06F 9/44521* (2013.01); *G06F 9/45545* (2013.01);
(Continued)

(58) Field of Classification Search
CPC ............ G06F 9/45533; G06F 9/44521; G06F 9/45545; G06F 9/45558; G06F 9/5005; G06F 9/5077; G06F 2009/45562
See application file for complete search history.

(56) References Cited

U.S. PATENT DOCUMENTS

| 4,949,254 A | 8/1990 | Shorter |
| 5,283,888 A | 2/1994 | Dao et al. |

(Continued)

FOREIGN PATENT DOCUMENTS

| CA | 2962633 C | 4/2012 |
| CA | 2975522 A1 | 8/2016 |

(Continued)

OTHER PUBLICATIONS

Abebe et al., "EC-Store: Bridging the Gap Between Storage and Latency in Distribute Erasure Coded Systems", IEEE 38th International Conference on Distributed Computing Systems, 2018, pp. 255-266.
(Continued)

*Primary Examiner* — Thuy Dao
(74) *Attorney, Agent, or Firm* — Knobbe, Martens, Olson & Bear, LLP

(57) ABSTRACT

A system for providing low latency computational capacity is provided. The system may be configured to maintain a pool of virtual machine instances, which may be assigned to users to service the requests associated with the users. The system may further be configured to receive a request to acquire compute capacity for executing a program code associated with a particular user, determine whether the pool of virtual machine instances includes a container that may be used to execute the program code therein, and cause the program code of the particular user to be executed in the container.

20 Claims, 5 Drawing Sheets

Related U.S. Application Data continuation of application No. 15/468,724, filed on Mar. 24, 2017, now Pat. No. 10,108,443, which is a continuation of application No. 14/502,810, filed on Sep. 30, 2014, now Pat. No. 9,678,773.

(51) Int. Cl.
*G06F 9/445* (2018.01)
*G06F 9/50* (2006.01)
*G06F 15/16* (2006.01)
*G06F 15/173* (2006.01)
*H04L 29/08* (2006.01)

(52) U.S. Cl.
CPC ........ *G06F 9/45558* (2013.01); *G06F 9/5005* (2013.01); *G06F 9/5077* (2013.01); *G06F 2009/45562* (2013.01)

(56) References Cited

U.S. PATENT DOCUMENTS

| | | | |
|---|---|---|---|
| 5,835,764 A | 11/1998 | Platt et al. | |
| 5,970,488 A | 10/1999 | Crowe et al. | |
| 5,983,197 A | 11/1999 | Enta | |
| 6,237,005 B1 | 5/2001 | Griffin | |
| 6,260,058 B1 | 7/2001 | Hoenninger et al. | |
| 6,385,636 B1 | 5/2002 | Suzuki | |
| 6,463,509 B1 | 10/2002 | Teoman et al. | |
| 6,501,736 B1 | 12/2002 | Smolik et al. | |
| 6,523,035 B1 | 2/2003 | Fleming et al. | |
| 6,549,936 B1 | 4/2003 | Hirabayashi | |
| 6,708,276 B1 | 3/2004 | Yarsa et al. | |
| 7,036,121 B1 | 4/2006 | Casabona et al. | |
| 7,308,463 B2 | 12/2007 | Taulbee et al. | |
| 7,340,522 B1 | 3/2008 | Basu et al. | |
| 7,360,215 B2 | 4/2008 | Kraiss et al. | |
| 7,558,719 B1 | 7/2009 | Donlin | |
| 7,577,722 B1 | 8/2009 | Khandekar et al. | |
| 7,580,992 B2 * | 8/2009 | Eisenbeis | G05B 19/4185 700/83 |
| 7,590,806 B2 | 9/2009 | Harris et al. | |
| 7,620,987 B2 * | 11/2009 | Shelest | G06F 21/566 713/189 |
| 7,640,574 B1 | 12/2009 | Kim et al. | |
| 7,665,090 B1 | 2/2010 | Tormasov et al. | |
| 7,707,579 B2 | 4/2010 | Rodriguez | |
| 7,730,464 B2 | 6/2010 | Trowbridge | |
| 7,774,191 B2 | 8/2010 | Berkowitz et al. | |
| 7,823,186 B2 | 10/2010 | Pouliot | |
| 7,831,464 B1 | 11/2010 | Nichols et al. | |
| 7,870,153 B2 | 1/2011 | Croft et al. | |
| 7,886,021 B2 | 2/2011 | Scheifler et al. | |
| 7,949,677 B2 | 5/2011 | Croft et al. | |
| 7,954,150 B2 | 5/2011 | Croft et al. | |
| 8,010,679 B2 | 8/2011 | Low et al. | |
| 8,010,990 B2 | 8/2011 | Ferguson et al. | |
| 8,024,564 B2 | 9/2011 | Bassani et al. | |
| 8,046,765 B2 | 10/2011 | Cherkasova et al. | |
| 8,051,180 B2 | 11/2011 | Mazzaferri et al. | |
| 8,051,266 B2 | 11/2011 | DeVal et al. | |
| 8,065,676 B1 | 11/2011 | Sahai et al. | |
| 8,065,682 B2 | 11/2011 | Baryshnikov et al. | |
| 8,095,931 B1 | 1/2012 | Chen et al. | |
| 8,127,284 B2 | 2/2012 | Meijer et al. | |
| 8,146,073 B2 | 3/2012 | Sinha | |
| 8,166,304 B2 | 4/2012 | Murase et al. | |
| 8,171,473 B2 | 5/2012 | Lavin | |
| 8,201,026 B1 | 6/2012 | Bornstein et al. | |
| 8,209,695 B1 | 6/2012 | Pruyne et al. | |
| 8,219,987 B1 | 7/2012 | Vlaovic et al. | |
| 8,296,267 B2 | 10/2012 | Cahill et al. | |
| 8,321,554 B2 | 11/2012 | Dickinson | |
| 8,321,558 B1 | 11/2012 | Sirota et al. | |
| 8,336,079 B2 | 12/2012 | Budko et al. | |
| 8,352,608 B1 | 1/2013 | Keagy et al. | |
| 8,387,075 B1 | 2/2013 | McCann et al. | |
| 8,392,558 B1 | 3/2013 | Ahuja et al. | |
| 8,402,514 B1 | 3/2013 | Thompson et al. | |
| 8,417,723 B1 | 4/2013 | Lissack et al. | |
| 8,429,282 B1 | 4/2013 | Ahuja | |
| 8,448,165 B1 | 5/2013 | Conover | |
| 8,479,195 B2 | 7/2013 | Adams et al. | |
| 8,490,088 B2 | 7/2013 | Tang | |
| 8,555,281 B1 | 10/2013 | Van Dijk et al. | |
| 8,560,699 B1 | 10/2013 | Theimer et al. | |
| 8,566,835 B2 | 10/2013 | Wang et al. | |
| 8,601,323 B2 | 12/2013 | Tsantilis | |
| 8,613,070 B1 | 12/2013 | Borzycki et al. | |
| 8,615,589 B1 | 12/2013 | Adogla et al. | |
| 8,631,130 B2 | 1/2014 | Jackson | |
| 8,667,471 B2 | 3/2014 | Wintergerst et al. | |
| 8,677,359 B1 | 3/2014 | Cavage et al. | |
| 8,694,996 B2 | 4/2014 | Cawlfield et al. | |
| 8,700,768 B2 | 4/2014 | Benari | |
| 8,713,093 B1 | 4/2014 | Upadhyay et al. | |
| 8,719,415 B1 | 5/2014 | Sirota et al. | |
| 8,725,702 B1 | 5/2014 | Raman et al. | |
| 8,756,322 B1 | 6/2014 | Lynch | |
| 8,756,696 B1 | 6/2014 | Miller | |
| 8,763,091 B1 | 6/2014 | Singh et al. | |
| 8,769,519 B2 | 7/2014 | Leitman et al. | |
| 8,793,676 B2 | 7/2014 | Quinn et al. | |
| 8,799,236 B1 | 8/2014 | Azari et al. | |
| 8,799,879 B2 | 8/2014 | Wright et al. | |
| 8,806,266 B1 | 8/2014 | Qu et al. | |
| 8,806,468 B2 | 8/2014 | Meijer et al. | |
| 8,806,644 B1 | 8/2014 | McCorkendale et al. | |
| 8,819,679 B2 | 8/2014 | Agarwal et al. | |
| 8,825,863 B2 | 9/2014 | Hansson et al. | |
| 8,825,964 B1 | 9/2014 | Sopka et al. | |
| 8,839,035 B1 | 9/2014 | Dimitrovich et al. | |
| 8,850,432 B2 | 9/2014 | Mcgrath et al. | |
| 8,869,300 B2 | 10/2014 | Singh et al. | |
| 8,874,952 B2 | 10/2014 | Tameshige et al. | |
| 8,904,008 B2 | 12/2014 | Calder et al. | |
| 8,949,457 B1 | 2/2015 | Theroux et al. | |
| 8,966,495 B2 | 2/2015 | Kulkarni | |
| 8,972,980 B2 | 3/2015 | Banga et al. | |
| 8,990,807 B2 | 3/2015 | Wu et al. | |
| 8,997,093 B2 | 3/2015 | Dimitrov | |
| 9,002,871 B2 | 4/2015 | Bulkowski et al. | |
| 9,021,501 B2 | 4/2015 | Li et al. | |
| 9,026,658 B2 | 5/2015 | Xu et al. | |
| 9,027,087 B2 | 5/2015 | Ishaya et al. | |
| 9,038,068 B2 | 5/2015 | Engle et al. | |
| 9,052,935 B1 | 6/2015 | Rajaa | |
| 9,086,897 B2 | 7/2015 | Oh et al. | |
| 9,086,924 B2 | 7/2015 | Barsness et al. | |
| 9,092,837 B2 | 7/2015 | Bala et al. | |
| 9,098,528 B2 | 8/2015 | Wang | |
| 9,104,477 B2 | 8/2015 | Kodialam et al. | |
| 9,110,732 B1 | 8/2015 | Forschmiedt et al. | |
| 9,110,770 B1 | 8/2015 | Raju et al. | |
| 9,111,037 B1 | 8/2015 | Nalis et al. | |
| 9,112,813 B2 | 8/2015 | Jackson | |
| 9,116,733 B2 | 8/2015 | Banga et al. | |
| 9,130,900 B2 | 9/2015 | Tran | |
| 9,141,410 B2 | 9/2015 | Leafe et al. | |
| 9,146,764 B1 | 9/2015 | Wagner | |
| 9,152,406 B2 | 10/2015 | De et al. | |
| 9,154,955 B1 | 10/2015 | Bertz et al. | |
| 9,164,754 B1 | 10/2015 | Pohlack | |
| 9,176,871 B1 | 11/2015 | Serlet | |
| 9,183,019 B2 | 11/2015 | Kruglick | |
| 9,189,778 B1 | 11/2015 | Sh. Al-Rashidi | |
| 9,195,520 B2 | 11/2015 | Turk | |
| 9,208,007 B2 | 12/2015 | Harper et al. | |
| 9,218,190 B2 | 12/2015 | Anand et al. | |
| 9,223,561 B2 | 12/2015 | Orveillon et al. | |
| 9,223,966 B1 | 12/2015 | Satish et al. | |
| 9,250,893 B2 | 2/2016 | Blahaerath et al. | |
| 9,268,586 B2 | 2/2016 | Voccio et al. | |
| 9,294,236 B1 * | 3/2016 | Ward, Jr. | H04L 67/535 |
| 9,298,633 B1 | 3/2016 | Zhao et al. | |

(56) References Cited

U.S. PATENT DOCUMENTS

| | | | |
|---|---|---|---|
| 9,317,689 B2 | 4/2016 | Aissi |
| 9,323,556 B2 | 4/2016 | Wagner |
| 9,361,145 B1 | 6/2016 | Wilson et al. |
| 9,405,582 B2 | 8/2016 | Fuller et al. |
| 9,411,645 B1 | 8/2016 | Duan et al. |
| 9,413,626 B2 | 8/2016 | Reque et al. |
| 9,417,918 B2 | 8/2016 | Chin et al. |
| 9,430,290 B1 | 8/2016 | Gupta et al. |
| 9,436,555 B2 | 9/2016 | Dornemann et al. |
| 9,461,996 B2 | 10/2016 | Hayton et al. |
| 9,471,775 B1 | 10/2016 | Wagner et al. |
| 9,471,776 B2 | 10/2016 | Gu et al. |
| 9,483,335 B1 | 11/2016 | Wagner et al. |
| 9,489,227 B2 | 11/2016 | Oh et al. |
| 9,497,136 B1 | 11/2016 | Ramarao et al. |
| 9,501,345 B1 | 11/2016 | Lietz et al. |
| 9,514,037 B1 | 12/2016 | Dow et al. |
| 9,537,788 B2 | 1/2017 | Reque et al. |
| 9,563,613 B1 | 2/2017 | Dinkel et al. |
| 9,565,190 B1 | 2/2017 | Telvik et al. |
| 9,575,798 B2 | 2/2017 | Terayama et al. |
| 9,588,790 B1 | 3/2017 | Wagner et al. |
| 9,594,590 B2 | 3/2017 | Hsu |
| 9,596,350 B1 | 3/2017 | Dymshyts et al. |
| 9,600,312 B2 | 3/2017 | Wagner et al. |
| 9,613,127 B1 | 4/2017 | Rus et al. |
| 9,626,204 B1 | 4/2017 | Banga et al. |
| 9,628,332 B2 | 4/2017 | Bruno, Jr. et al. |
| 9,635,132 B1 | 4/2017 | Lin et al. |
| 9,652,306 B1 | 5/2017 | Wagner et al. |
| 9,652,617 B1 | 5/2017 | Evans et al. |
| 9,654,508 B2 | 5/2017 | Barton et al. |
| 9,661,011 B1 | 5/2017 | Van Horenbeeck et al. |
| 9,678,773 B1 | 6/2017 | Wagner et al. |
| 9,678,778 B1 | 6/2017 | Youseff |
| 9,703,681 B2 | 7/2017 | Taylor et al. |
| 9,715,402 B2 | 7/2017 | Wagner et al. |
| 9,720,661 B2 | 8/2017 | Gschwind et al. |
| 9,720,662 B2 | 8/2017 | Gschwind et al. |
| 9,727,725 B2 | 8/2017 | Wagner et al. |
| 9,733,967 B2 | 8/2017 | Wagner et al. |
| 9,760,387 B2 | 9/2017 | Wagner et al. |
| 9,760,443 B2 | 9/2017 | Tarasuk-Levin et al. |
| 9,767,271 B2 | 9/2017 | Ghose |
| 9,785,476 B2 | 10/2017 | Wagner et al. |
| 9,787,779 B2 | 10/2017 | Frank et al. |
| 9,798,831 B2 | 10/2017 | Chattopadhyay et al. |
| 9,799,017 B1 | 10/2017 | Vermeulen et al. |
| 9,811,363 B1 | 11/2017 | Wagner |
| 9,811,434 B1 | 11/2017 | Wagner |
| 9,817,695 B2 | 11/2017 | Clark |
| 9,830,175 B1 | 11/2017 | Wagner |
| 9,830,193 B1 | 11/2017 | Wagner et al. |
| 9,830,449 B1 | 11/2017 | Wagner |
| 9,864,636 B1 | 1/2018 | Patel et al. |
| 9,898,393 B2 | 2/2018 | Moorthi et al. |
| 9,910,713 B2 | 3/2018 | Wisniewski et al. |
| 9,921,864 B2 | 3/2018 | Singaravelu et al. |
| 9,928,108 B1 | 3/2018 | Wagner et al. |
| 9,929,916 B1 | 3/2018 | Subramanian et al. |
| 9,930,103 B2 | 3/2018 | Thompson |
| 9,930,133 B2 | 3/2018 | Susarla et al. |
| 9,952,896 B2 | 4/2018 | Wagner et al. |
| 9,977,691 B2 | 5/2018 | Marriner et al. |
| 9,979,817 B2 | 5/2018 | Huang et al. |
| 9,983,982 B1 | 5/2018 | Kumar et al. |
| 10,002,026 B1 | 6/2018 | Wagner |
| 10,002,036 B2 | 6/2018 | Fuchs et al. |
| 10,013,267 B1 | 7/2018 | Wagner et al. |
| 10,042,660 B2 | 8/2018 | Wagner et al. |
| 10,048,974 B1 | 8/2018 | Wagner et al. |
| 10,061,613 B1 | 8/2018 | Brooker et al. |
| 10,067,801 B1 | 9/2018 | Wagner |
| 10,102,040 B2 | 10/2018 | Marriner et al. |
| 10,108,443 B2 | 10/2018 | Wagner et al. |
| 10,139,876 B2 | 11/2018 | Lu et al. |
| 10,140,137 B2 | 11/2018 | Wagner |
| 10,146,635 B1 | 12/2018 | Chai et al. |
| 10,162,655 B2 | 12/2018 | Tuch et al. |
| 10,162,672 B2 | 12/2018 | Wagner et al. |
| 10,162,688 B2 | 12/2018 | Wagner |
| 10,191,861 B1 | 1/2019 | Steinberg |
| 10,193,839 B2 | 1/2019 | Tandon et al. |
| 10,198,298 B2 | 2/2019 | Bishop et al. |
| 10,203,990 B2 | 2/2019 | Wagner et al. |
| 10,248,467 B2 | 4/2019 | Wisniewski et al. |
| 10,255,090 B2 | 4/2019 | Tuch et al. |
| 10,277,708 B2 | 4/2019 | Wagner et al. |
| 10,282,229 B2 | 5/2019 | Wagner et al. |
| 10,303,492 B1 | 5/2019 | Wagner et al. |
| 10,331,462 B1 | 6/2019 | Varda et al. |
| 10,346,625 B2 | 7/2019 | Anderson et al. |
| 10,353,678 B1 | 7/2019 | Wagner |
| 10,353,746 B2 | 7/2019 | Reque et al. |
| 10,360,025 B2 | 7/2019 | Foskett et al. |
| 10,360,067 B1 | 7/2019 | Wagner |
| 10,365,985 B2 | 7/2019 | Wagner |
| 10,387,177 B2 | 8/2019 | Wagner et al. |
| 10,402,231 B2 | 9/2019 | Marriner et al. |
| 10,423,158 B1 | 9/2019 | Hadlich |
| 10,437,629 B2 | 10/2019 | Wagner et al. |
| 10,445,140 B1 | 10/2019 | Sagar et al. |
| 10,459,822 B1 | 10/2019 | Gondi |
| 10,496,547 B1 | 12/2019 | Naenko et al. |
| 10,503,626 B2 | 12/2019 | Idicula et al. |
| 10,528,390 B2 | 1/2020 | Brooker et al. |
| 10,531,226 B1 | 1/2020 | Wang et al. |
| 10,552,193 B2 | 2/2020 | Wagner et al. |
| 10,552,442 B1 | 2/2020 | Lusk et al. |
| 10,564,946 B1 | 2/2020 | Wagner et al. |
| 10,567,492 B1 | 2/2020 | Natarajan |
| 10,572,375 B1 | 2/2020 | Wagner |
| 10,592,269 B2 | 3/2020 | Wagner et al. |
| 10,608,973 B2 | 3/2020 | Kuo et al. |
| 10,615,984 B1 | 4/2020 | Wang |
| 10,623,476 B2 | 4/2020 | Thompson |
| 10,637,817 B2 | 4/2020 | Kuo et al. |
| 10,649,749 B1 | 5/2020 | Brooker et al. |
| 10,649,792 B1 | 5/2020 | Kulchytskyy et al. |
| 10,650,156 B2 | 5/2020 | Anderson et al. |
| 10,652,350 B2 | 5/2020 | Wozniak |
| 10,678,522 B1 | 6/2020 | Yerramreddy et al. |
| 10,686,605 B2 | 6/2020 | Chhabra et al. |
| 10,691,498 B2 | 6/2020 | Wagner |
| 10,713,080 B1 | 7/2020 | Brooker et al. |
| 10,719,367 B1 | 7/2020 | Kim et al. |
| 10,725,752 B1 | 7/2020 | Wagner et al. |
| 10,725,826 B1 | 7/2020 | Sagar et al. |
| 10,732,951 B2 | 8/2020 | Jayanthi et al. |
| 10,733,085 B1 | 8/2020 | Wagner |
| 10,754,701 B1 | 8/2020 | Wagner |
| 10,776,091 B1 | 9/2020 | Wagner et al. |
| 10,776,171 B2 | 9/2020 | Wagner et al. |
| 10,817,331 B2 | 10/2020 | Mullen et al. |
| 10,817,346 B1 | 10/2020 | Culp et al. |
| 10,824,484 B2 | 11/2020 | Wagner et al. |
| 10,831,898 B1 | 11/2020 | Wagner |
| 10,846,117 B1 | 11/2020 | Steinberg |
| 10,853,112 B2 | 12/2020 | Wagner et al. |
| 10,853,115 B2 | 12/2020 | Mullen et al. |
| 10,884,722 B2 | 1/2021 | Brooker et al. |
| 10,884,787 B1 | 1/2021 | Wagner et al. |
| 10,884,802 B2 | 1/2021 | Wagner et al. |
| 10,884,812 B2 | 1/2021 | Brooker et al. |
| 10,891,145 B2 | 1/2021 | Wagner et al. |
| 10,915,371 B2 | 2/2021 | Wagner et al. |
| 10,942,795 B1 | 3/2021 | Yanacek et al. |
| 10,949,237 B2 | 3/2021 | Piwonka et al. |
| 10,956,185 B2 | 3/2021 | Wagner |
| 10,956,244 B1 | 3/2021 | Cho |
| 11,010,188 B1 | 5/2021 | Brooker et al. |
| 11,016,815 B2 | 5/2021 | Wisniewski et al. |
| 11,044,198 B1 | 6/2021 | Ahn et al. |
| 11,082,333 B1 | 8/2021 | Lam et al. |

(56) References Cited

U.S. PATENT DOCUMENTS

| | | |
|---|---|---|
| 11,095,706 B1 | 8/2021 | Ankam et al. |
| 11,099,870 B1 | 8/2021 | Brooker et al. |
| 11,099,917 B2 | 8/2021 | Hussels et al. |
| 11,115,404 B2 | 9/2021 | Siefker et al. |
| 11,119,809 B1 | 9/2021 | Brooker et al. |
| 11,119,813 B1 | 9/2021 | Kasaragod |
| 11,119,826 B2 | 9/2021 | Yanacek et al. |
| 11,126,469 B2 | 9/2021 | Reque et al. |
| 11,132,213 B1 | 9/2021 | Wagner et al. |
| 11,146,569 B1 | 10/2021 | Brooker et al. |
| 11,159,528 B2 | 10/2021 | Siefker et al. |
| 11,188,391 B1 | 11/2021 | Sule |
| 11,190,609 B2 | 11/2021 | Siefker et al. |
| 11,231,955 B1 | 1/2022 | Shahane et al. |
| 11,243,819 B1 | 2/2022 | Wagner |
| 11,243,953 B2 | 2/2022 | Wagner et al. |
| 11,263,034 B2 | 3/2022 | Wagner et al. |
| 11,327,992 B1 | 5/2022 | Batsakis et al. |
| 11,354,169 B2 | 6/2022 | Marriner et al. |
| 11,360,793 B2 | 6/2022 | Wagner et al. |
| 11,392,497 B1 | 7/2022 | Brooker et al. |
| 11,461,124 B2 | 10/2022 | Wagner et al. |
| 11,467,890 B2 | 10/2022 | Wagner |
| 11,550,713 B1 | 1/2023 | Piwonka et al. |
| 11,561,811 B2 | 1/2023 | Wagner |
| 11,593,270 B1 | 2/2023 | Brooker et al. |
| 11,714,675 B2 | 8/2023 | Brooker et al. |
| 11,836,516 B2 | 12/2023 | Brooker et al. |
| 11,861,386 B1 | 1/2024 | Varun Mukesh et al. |
| 11,875,173 B2 | 1/2024 | Mullen et al. |
| 11,943,093 B1 | 3/2024 | Brooker et al. |
| 11,968,280 B1 | 4/2024 | Sood et al. |
| 12,015,603 B2 | 6/2024 | Danilov et al. |
| 2001/0044817 A1 | 11/2001 | Asano et al. |
| 2002/0083012 A1 | 6/2002 | Bush et al. |
| 2002/0120685 A1 | 8/2002 | Srivastava et al. |
| 2002/0172273 A1 | 11/2002 | Baker et al. |
| 2003/0066063 A1* | 4/2003 | Yokota ............... G06F 8/60 717/173 |
| 2003/0071842 A1 | 4/2003 | King et al. |
| 2003/0084434 A1 | 5/2003 | Ren |
| 2003/0126200 A1 | 7/2003 | Wolff |
| 2003/0149801 A1 | 8/2003 | Kushnirskiy |
| 2003/0177186 A1 | 9/2003 | Goodman et al. |
| 2003/0191795 A1 | 10/2003 | Bernardin et al. |
| 2003/0208569 A1 | 11/2003 | O'Brien et al. |
| 2003/0229794 A1 | 12/2003 | James, II et al. |
| 2004/0003087 A1 | 1/2004 | Chambliss et al. |
| 2004/0019886 A1 | 1/2004 | Berent et al. |
| 2004/0044721 A1 | 3/2004 | Song et al. |
| 2004/0049768 A1 | 3/2004 | Matsuyama et al. |
| 2004/0098154 A1 | 5/2004 | McCarthy |
| 2004/0158551 A1 | 8/2004 | Santosuosso |
| 2004/0205493 A1 | 10/2004 | Simpson et al. |
| 2004/0249947 A1 | 12/2004 | Novaes et al. |
| 2004/0268358 A1 | 12/2004 | Darling et al. |
| 2005/0027611 A1 | 2/2005 | Wharton |
| 2005/0044301 A1 | 2/2005 | Vasilevsky et al. |
| 2005/0120160 A1 | 6/2005 | Plouffe et al. |
| 2005/0132167 A1 | 6/2005 | Longobardi |
| 2005/0132368 A1 | 6/2005 | Sexton et al. |
| 2005/0149535 A1 | 7/2005 | Frey et al. |
| 2005/0193113 A1 | 9/2005 | Kokusho et al. |
| 2005/0193283 A1 | 9/2005 | Reinhardt et al. |
| 2005/0237948 A1 | 10/2005 | Wan et al. |
| 2005/0257051 A1 | 11/2005 | Richard |
| 2005/0262183 A1 | 11/2005 | Colrain et al. |
| 2005/0262512 A1 | 11/2005 | Schmidt et al. |
| 2006/0010440 A1 | 1/2006 | Anderson et al. |
| 2006/0015740 A1 | 1/2006 | Kramer |
| 2006/0031448 A1 | 2/2006 | Chu et al. |
| 2006/0036941 A1 | 2/2006 | Neil |
| 2006/0080678 A1 | 4/2006 | Bailey et al. |
| 2006/0123066 A1 | 6/2006 | Jacobs et al. |
| 2006/0129684 A1 | 6/2006 | Datta |
| 2006/0155800 A1 | 7/2006 | Matsumoto |
| 2006/0168174 A1 | 7/2006 | Gebhart et al. |
| 2006/0184669 A1 | 8/2006 | Vaidyanathan et al. |
| 2006/0200668 A1 | 9/2006 | Hybre et al. |
| 2006/0212332 A1 | 9/2006 | Jackson |
| 2006/0218601 A1 | 9/2006 | Michel |
| 2006/0242647 A1 | 10/2006 | Kimbrel et al. |
| 2006/0242709 A1 | 10/2006 | Seinfeld et al. |
| 2006/0248195 A1 | 11/2006 | Toumura et al. |
| 2006/0259763 A1 | 11/2006 | Cooperstein et al. |
| 2006/0282330 A1 | 12/2006 | Frank et al. |
| 2006/0288120 A1 | 12/2006 | Hoshino et al. |
| 2007/0033085 A1 | 2/2007 | Johnson |
| 2007/0050779 A1 | 3/2007 | Hayashi |
| 2007/0067321 A1 | 3/2007 | Bissett et al. |
| 2007/0076244 A1 | 4/2007 | Suzuki et al. |
| 2007/0094396 A1 | 4/2007 | Takano et al. |
| 2007/0101325 A1 | 5/2007 | Bystricky et al. |
| 2007/0112864 A1 | 5/2007 | Ben-Natan |
| 2007/0130341 A1 | 6/2007 | Ma |
| 2007/0174419 A1 | 7/2007 | O'Connell et al. |
| 2007/0180449 A1 | 8/2007 | Croft et al. |
| 2007/0180450 A1 | 8/2007 | Croft et al. |
| 2007/0180493 A1 | 8/2007 | Croft et al. |
| 2007/0186212 A1 | 8/2007 | Mazzaferri et al. |
| 2007/0192082 A1 | 8/2007 | Gaos et al. |
| 2007/0192329 A1 | 8/2007 | Croft et al. |
| 2007/0198656 A1 | 8/2007 | Mazzaferri et al. |
| 2007/0199000 A1 | 8/2007 | Shekhel et al. |
| 2007/0220009 A1 | 9/2007 | Morris et al. |
| 2007/0226700 A1 | 9/2007 | Gal et al. |
| 2007/0240160 A1 | 10/2007 | Paterson-Jones |
| 2007/0255604 A1 | 11/2007 | Seelig |
| 2007/0300297 A1 | 12/2007 | Dawson et al. |
| 2008/0028409 A1 | 1/2008 | Cherkasova et al. |
| 2008/0052401 A1 | 2/2008 | Bugenhagen et al. |
| 2008/0052725 A1 | 2/2008 | Stoodley et al. |
| 2008/0082977 A1 | 4/2008 | Araujo et al. |
| 2008/0104247 A1 | 5/2008 | Venkatakrishnan et al. |
| 2008/0104608 A1 | 5/2008 | Hyser et al. |
| 2008/0115143 A1 | 5/2008 | Shimizu et al. |
| 2008/0126110 A1 | 5/2008 | Haeberle et al. |
| 2008/0126486 A1 | 5/2008 | Heist |
| 2008/0127125 A1 | 5/2008 | Anckaert et al. |
| 2008/0147893 A1 | 6/2008 | Marripudi et al. |
| 2008/0178278 A1 | 7/2008 | Grinstein et al. |
| 2008/0184340 A1 | 7/2008 | Nakamura et al. |
| 2008/0189468 A1 | 8/2008 | Schmidt et al. |
| 2008/0195369 A1 | 8/2008 | Duyanovich et al. |
| 2008/0201568 A1 | 8/2008 | Quinn et al. |
| 2008/0201711 A1 | 8/2008 | Amir Husain |
| 2008/0209423 A1 | 8/2008 | Hirai |
| 2008/0244547 A1 | 10/2008 | Wintergerst et al. |
| 2008/0288940 A1 | 11/2008 | Adams et al. |
| 2008/0307098 A1 | 12/2008 | Kelly |
| 2009/0006897 A1 | 1/2009 | Sarsfield |
| 2009/0013153 A1 | 1/2009 | Hilton |
| 2009/0018892 A1 | 1/2009 | Grey et al. |
| 2009/0025009 A1 | 1/2009 | Brunswig et al. |
| 2009/0034537 A1 | 2/2009 | Colrain et al. |
| 2009/0055810 A1 | 2/2009 | Kondur |
| 2009/0055829 A1 | 2/2009 | Gibson |
| 2009/0070355 A1 | 3/2009 | Cadarette et al. |
| 2009/0077569 A1 | 3/2009 | Appleton et al. |
| 2009/0125902 A1 | 5/2009 | Ghosh et al. |
| 2009/0158275 A1 | 6/2009 | Wang et al. |
| 2009/0158407 A1 | 6/2009 | Nicodemus et al. |
| 2009/0177860 A1 | 7/2009 | Zhu et al. |
| 2009/0183162 A1 | 7/2009 | Kindel et al. |
| 2009/0193410 A1 | 7/2009 | Arthursson et al. |
| 2009/0198769 A1 | 8/2009 | Keller et al. |
| 2009/0204960 A1 | 8/2009 | Ben-yehuda et al. |
| 2009/0204964 A1 | 8/2009 | Foley et al. |
| 2009/0222922 A1 | 9/2009 | Sidiroglou et al. |
| 2009/0271472 A1 | 10/2009 | Scheifler et al. |
| 2009/0288084 A1 | 11/2009 | Astete et al. |
| 2009/0300151 A1 | 12/2009 | Friedman et al. |
| 2009/0300599 A1 | 12/2009 | Piotrowski |
| 2009/0307430 A1 | 12/2009 | Bruening et al. |

(56) References Cited

U.S. PATENT DOCUMENTS

| | | |
|---|---|---|
| 2010/0023940 A1 | 1/2010 | Iwamatsu et al. |
| 2010/0031274 A1 | 2/2010 | Sim-Tang |
| 2010/0031325 A1 | 2/2010 | Maigne et al. |
| 2010/0036925 A1 | 2/2010 | Haffner |
| 2010/0037031 A1 | 2/2010 | DeSantis et al. |
| 2010/0058294 A1 | 3/2010 | Best et al. |
| 2010/0058342 A1 | 3/2010 | Machida |
| 2010/0058351 A1 | 3/2010 | Yahagi |
| 2010/0064299 A1 | 3/2010 | Kacin et al. |
| 2010/0070678 A1 | 3/2010 | Zhang et al. |
| 2010/0070725 A1 | 3/2010 | Prahlad et al. |
| 2010/0083048 A1 | 4/2010 | Calinoiu et al. |
| 2010/0083248 A1 | 4/2010 | Wood et al. |
| 2010/0094816 A1 | 4/2010 | Groves, Jr. et al. |
| 2010/0106926 A1 | 4/2010 | Kandasamy et al. |
| 2010/0114825 A1 | 5/2010 | Siddegowda |
| 2010/0115098 A1 | 5/2010 | De Baer et al. |
| 2010/0122343 A1 | 5/2010 | Ghosh |
| 2010/0131936 A1 | 5/2010 | Cheriton |
| 2010/0131959 A1 | 5/2010 | Spiers et al. |
| 2010/0146004 A1 | 6/2010 | Sim-Tang |
| 2010/0169477 A1 | 7/2010 | Stienhans et al. |
| 2010/0186011 A1 | 7/2010 | Magenheimer |
| 2010/0198972 A1 | 8/2010 | Umbehocker |
| 2010/0199285 A1 | 8/2010 | Medovich |
| 2010/0257116 A1 | 10/2010 | Mehta et al. |
| 2010/0257269 A1 | 10/2010 | Clark |
| 2010/0269109 A1 | 10/2010 | Cartales |
| 2010/0298011 A1 | 11/2010 | Pelley et al. |
| 2010/0299541 A1 | 11/2010 | Ishikawa et al. |
| 2010/0312871 A1* | 12/2010 | DeSantis ............... G06F 9/5044 709/223 |
| 2010/0325727 A1 | 12/2010 | Neystadt et al. |
| 2010/0329149 A1 | 12/2010 | Singh et al. |
| 2010/0329643 A1 | 12/2010 | Kuang |
| 2011/0004687 A1 | 1/2011 | Takemura |
| 2011/0010690 A1 | 1/2011 | Howard et al. |
| 2011/0010722 A1 | 1/2011 | Matsuyama |
| 2011/0023026 A1 | 1/2011 | Oza |
| 2011/0029970 A1 | 2/2011 | Arasaratnam |
| 2011/0029984 A1 | 2/2011 | Norman et al. |
| 2011/0035785 A1 | 2/2011 | Mihara |
| 2011/0040812 A1 | 2/2011 | Phillips |
| 2011/0055378 A1 | 3/2011 | Ferris et al. |
| 2011/0055396 A1 | 3/2011 | DeHaan |
| 2011/0055683 A1 | 3/2011 | Jiang |
| 2011/0078679 A1 | 3/2011 | Bozek et al. |
| 2011/0099204 A1 | 4/2011 | Thaler |
| 2011/0099551 A1 | 4/2011 | Fahrig et al. |
| 2011/0131572 A1 | 6/2011 | Elyashev et al. |
| 2011/0134761 A1 | 6/2011 | Smith |
| 2011/0141124 A1 | 6/2011 | Halls et al. |
| 2011/0153541 A1 | 6/2011 | Koch et al. |
| 2011/0153727 A1 | 6/2011 | Li |
| 2011/0153838 A1 | 6/2011 | Belkine et al. |
| 2011/0154353 A1 | 6/2011 | Theroux et al. |
| 2011/0173637 A1 | 7/2011 | Brandwine et al. |
| 2011/0179162 A1 | 7/2011 | Mayo et al. |
| 2011/0184993 A1 | 7/2011 | Chawla et al. |
| 2011/0208866 A1 | 8/2011 | Marmolejo-Meillon et al. |
| 2011/0225277 A1 | 9/2011 | Freimuth et al. |
| 2011/0231680 A1 | 9/2011 | Padmanabhan et al. |
| 2011/0247005 A1 | 10/2011 | Benedetti et al. |
| 2011/0258603 A1 | 10/2011 | Wisnovsky et al. |
| 2011/0265067 A1 | 10/2011 | Schulte et al. |
| 2011/0265069 A1 | 10/2011 | Fee et al. |
| 2011/0265164 A1 | 10/2011 | Lucovsky |
| 2011/0271276 A1 | 11/2011 | Ashok et al. |
| 2011/0276945 A1 | 11/2011 | Chasman et al. |
| 2011/0276963 A1 | 11/2011 | Wu et al. |
| 2011/0296412 A1 | 12/2011 | Banga et al. |
| 2011/0314465 A1 | 12/2011 | Smith et al. |
| 2011/0321033 A1 | 12/2011 | Kelkar et al. |
| 2011/0321051 A1 | 12/2011 | Rastogi |
| 2012/0011496 A1 | 1/2012 | Shimamura |
| 2012/0011511 A1 | 1/2012 | Horvitz et al. |
| 2012/0016721 A1 | 1/2012 | Weinman |
| 2012/0041970 A1 | 2/2012 | Ghosh et al. |
| 2012/0054744 A1 | 3/2012 | Singh et al. |
| 2012/0060207 A1 | 3/2012 | Mardikar et al. |
| 2012/0072762 A1 | 3/2012 | Atchison et al. |
| 2012/0072914 A1 | 3/2012 | Ota |
| 2012/0072920 A1 | 3/2012 | Kawamura |
| 2012/0079004 A1 | 3/2012 | Herman |
| 2012/0096271 A1 | 4/2012 | Ramarathinam et al. |
| 2012/0096468 A1 | 4/2012 | Chakravorty et al. |
| 2012/0102307 A1 | 4/2012 | Wong |
| 2012/0102333 A1 | 4/2012 | Wong |
| 2012/0102481 A1 | 4/2012 | Mani et al. |
| 2012/0102493 A1 | 4/2012 | Allen et al. |
| 2012/0110155 A1 | 5/2012 | Adlung et al. |
| 2012/0110164 A1 | 5/2012 | Frey et al. |
| 2012/0110570 A1 | 5/2012 | Jacobson et al. |
| 2012/0110588 A1 | 5/2012 | Bieswanger et al. |
| 2012/0110603 A1 | 5/2012 | Kaneko et al. |
| 2012/0124563 A1 | 5/2012 | Chung et al. |
| 2012/0131379 A1 | 5/2012 | Tameshige et al. |
| 2012/0144290 A1 | 6/2012 | Goldman et al. |
| 2012/0166624 A1 | 6/2012 | Suit et al. |
| 2012/0173709 A1 | 7/2012 | Li et al. |
| 2012/0192184 A1 | 7/2012 | Burckart et al. |
| 2012/0197795 A1 | 8/2012 | Campbell et al. |
| 2012/0197958 A1 | 8/2012 | Nightingale et al. |
| 2012/0198442 A1 | 8/2012 | Kashyap et al. |
| 2012/0198514 A1 | 8/2012 | McCune et al. |
| 2012/0204164 A1 | 8/2012 | Castanos et al. |
| 2012/0209947 A1 | 8/2012 | Glaser et al. |
| 2012/0222038 A1 | 8/2012 | Katragadda et al. |
| 2012/0233464 A1 | 9/2012 | Miller et al. |
| 2012/0254193 A1 | 10/2012 | Chattopadhyay et al. |
| 2012/0324052 A1* | 12/2012 | Paleja ................. H04L 63/0823 709/217 |
| 2012/0324236 A1 | 12/2012 | Srivastava et al. |
| 2012/0331113 A1 | 12/2012 | Jain et al. |
| 2013/0014101 A1 | 1/2013 | Ballani et al. |
| 2013/0042234 A1 | 2/2013 | DeLuca et al. |
| 2013/0054804 A1 | 2/2013 | Jana et al. |
| 2013/0054927 A1 | 2/2013 | Raj et al. |
| 2013/0055262 A1 | 2/2013 | Lubsey et al. |
| 2013/0061208 A1 | 3/2013 | Tsao et al. |
| 2013/0061212 A1 | 3/2013 | Krause et al. |
| 2013/0061220 A1 | 3/2013 | Gnanasambandam et al. |
| 2013/0067484 A1 | 3/2013 | Sonoda et al. |
| 2013/0067494 A1 | 3/2013 | Srour et al. |
| 2013/0080641 A1 | 3/2013 | Lui et al. |
| 2013/0091387 A1 | 4/2013 | Bohnet et al. |
| 2013/0097601 A1 | 4/2013 | Podvratnik et al. |
| 2013/0111032 A1 | 5/2013 | Alapati et al. |
| 2013/0111469 A1 | 5/2013 | B et al. |
| 2013/0124807 A1 | 5/2013 | Nielsen et al. |
| 2013/0132283 A1 | 5/2013 | Hayhow et al. |
| 2013/0132942 A1 | 5/2013 | Wang |
| 2013/0132953 A1 | 5/2013 | Chuang et al. |
| 2013/0139152 A1 | 5/2013 | Chang et al. |
| 2013/0139166 A1 | 5/2013 | Zhang et al. |
| 2013/0145354 A1 | 6/2013 | Bruening et al. |
| 2013/0151587 A1 | 6/2013 | Takeshima et al. |
| 2013/0151648 A1 | 6/2013 | Luna |
| 2013/0151684 A1 | 6/2013 | Forsman et al. |
| 2013/0152047 A1 | 6/2013 | Moorthi et al. |
| 2013/0167147 A1 | 6/2013 | Corrie et al. |
| 2013/0179574 A1 | 7/2013 | Calder et al. |
| 2013/0179881 A1 | 7/2013 | Calder et al. |
| 2013/0179894 A1 | 7/2013 | Calder et al. |
| 2013/0179895 A1 | 7/2013 | Calder et al. |
| 2013/0181998 A1 | 7/2013 | Malakapalli et al. |
| 2013/0185719 A1 | 7/2013 | Kar et al. |
| 2013/0185729 A1 | 7/2013 | Vasic et al. |
| 2013/0191847 A1* | 7/2013 | Sirota ................. G06F 11/1469 718/108 |
| 2013/0191924 A1 | 7/2013 | Tedesco |
| 2013/0198319 A1 | 8/2013 | Shen et al. |
| 2013/0198743 A1 | 8/2013 | Kruglick |
| 2013/0198748 A1 | 8/2013 | Sharp et al. |

(56) References Cited

U.S. PATENT DOCUMENTS

| | | |
|---|---|---|
| 2013/0198763 A1 | 8/2013 | Kunze et al. |
| 2013/0205092 A1 | 8/2013 | Roy et al. |
| 2013/0205114 A1 | 8/2013 | Badam et al. |
| 2013/0219390 A1 | 8/2013 | Lee et al. |
| 2013/0227097 A1 | 8/2013 | Yasuda et al. |
| 2013/0227534 A1 | 8/2013 | Ike et al. |
| 2013/0227563 A1 | 8/2013 | McGrath |
| 2013/0227641 A1 | 8/2013 | White et al. |
| 2013/0227710 A1 | 8/2013 | Barak et al. |
| 2013/0232190 A1 | 9/2013 | Miller et al. |
| 2013/0232480 A1 | 9/2013 | Winterfeldt et al. |
| 2013/0239125 A1 | 9/2013 | Iorio |
| 2013/0246944 A1 | 9/2013 | Pandiyan et al. |
| 2013/0262556 A1 | 10/2013 | Xu et al. |
| 2013/0263117 A1 | 10/2013 | Konik et al. |
| 2013/0274006 A1 | 10/2013 | Hudlow et al. |
| 2013/0275376 A1 | 10/2013 | Hudlow et al. |
| 2013/0275958 A1 | 10/2013 | Ivanov et al. |
| 2013/0275969 A1 | 10/2013 | Dimitrov |
| 2013/0275975 A1 | 10/2013 | Masuda et al. |
| 2013/0283141 A1 | 10/2013 | Stevenson et al. |
| 2013/0283176 A1 | 10/2013 | Hoole et al. |
| 2013/0290538 A1 | 10/2013 | Gmach et al. |
| 2013/0291087 A1 | 10/2013 | Kailash et al. |
| 2013/0297964 A1 | 11/2013 | Hegdal et al. |
| 2013/0298183 A1 | 11/2013 | McGrath et al. |
| 2013/0311650 A1 | 11/2013 | Brandwine et al. |
| 2013/0326506 A1 | 12/2013 | McGrath et al. |
| 2013/0326507 A1 | 12/2013 | McGrath et al. |
| 2013/0332660 A1 | 12/2013 | Talagala et al. |
| 2013/0339950 A1 | 12/2013 | Ramarathinam et al. |
| 2013/0346470 A1 | 12/2013 | Obstfeld et al. |
| 2013/0346946 A1 | 12/2013 | Pinnix |
| 2013/0346952 A1 | 12/2013 | Huang et al. |
| 2013/0346964 A1 | 12/2013 | Nobuoka et al. |
| 2013/0346987 A1 | 12/2013 | Raney et al. |
| 2013/0346994 A1 | 12/2013 | Chen et al. |
| 2013/0347095 A1 | 12/2013 | Barjatiya et al. |
| 2014/0007097 A1 | 1/2014 | Chin et al. |
| 2014/0019523 A1 | 1/2014 | Heymann et al. |
| 2014/0019735 A1 | 1/2014 | Menon et al. |
| 2014/0019965 A1 | 1/2014 | Neuse et al. |
| 2014/0019966 A1 | 1/2014 | Neuse et al. |
| 2014/0040343 A1 | 2/2014 | Nickolov et al. |
| 2014/0040857 A1 | 2/2014 | Trinchini et al. |
| 2014/0040880 A1 | 2/2014 | Brownlow et al. |
| 2014/0047437 A1 | 2/2014 | Wu et al. |
| 2014/0058871 A1 | 2/2014 | Marr et al. |
| 2014/0059209 A1 | 2/2014 | Alnoor |
| 2014/0059226 A1 | 2/2014 | Messerli et al. |
| 2014/0059552 A1 | 2/2014 | Cunningham et al. |
| 2014/0068568 A1 | 3/2014 | Wisnovsky |
| 2014/0068608 A1 | 3/2014 | Kulkarni |
| 2014/0068611 A1 | 3/2014 | McGrath et al. |
| 2014/0073300 A1 | 3/2014 | Leeder et al. |
| 2014/0081984 A1 | 3/2014 | Sitsky et al. |
| 2014/0082165 A1 | 3/2014 | Marr et al. |
| 2014/0082201 A1 | 3/2014 | Shankari et al. |
| 2014/0101643 A1 | 4/2014 | Inoue |
| 2014/0101649 A1 | 4/2014 | Kamble et al. |
| 2014/0108722 A1 | 4/2014 | Lipchuk et al. |
| 2014/0109087 A1 | 4/2014 | Jujare et al. |
| 2014/0109088 A1 | 4/2014 | Dournov et al. |
| 2014/0129667 A1 | 5/2014 | Ozawa |
| 2014/0130040 A1 | 5/2014 | Lemanski |
| 2014/0137110 A1 | 5/2014 | Engle et al. |
| 2014/0164551 A1 | 6/2014 | Resch et al. |
| 2014/0173614 A1 | 6/2014 | Konik et al. |
| 2014/0173616 A1 | 6/2014 | Bird et al. |
| 2014/0180862 A1 | 6/2014 | Certain et al. |
| 2014/0189677 A1 | 7/2014 | Curzi et al. |
| 2014/0189704 A1 | 7/2014 | Narvaez et al. |
| 2014/0201735 A1 | 7/2014 | Kannan et al. |
| 2014/0207912 A1 | 7/2014 | Thibeault |
| 2014/0214752 A1 | 7/2014 | Rash et al. |
| 2014/0215073 A1 | 7/2014 | Dow et al. |
| 2014/0229221 A1 | 8/2014 | Shih et al. |
| 2014/0229942 A1 | 8/2014 | Wiseman et al. |
| 2014/0245297 A1 | 8/2014 | Hackett |
| 2014/0258777 A1 | 9/2014 | Cheriton |
| 2014/0279581 A1 | 9/2014 | Devereaux |
| 2014/0280325 A1 | 9/2014 | Krishnamurthy et al. |
| 2014/0282418 A1 | 9/2014 | Wood et al. |
| 2014/0282559 A1 | 9/2014 | Verduzco et al. |
| 2014/0282615 A1 | 9/2014 | Cavage et al. |
| 2014/0282629 A1 | 9/2014 | Gupta et al. |
| 2014/0283045 A1 | 9/2014 | Brandwine et al. |
| 2014/0289286 A1 | 9/2014 | Gusak |
| 2014/0298295 A1 | 10/2014 | Overbeck |
| 2014/0304246 A1 | 10/2014 | Helmich et al. |
| 2014/0304698 A1 | 10/2014 | Chigurapati et al. |
| 2014/0304815 A1 | 10/2014 | Maeda |
| 2014/0317617 A1 | 10/2014 | O'Donnell |
| 2014/0330936 A1 | 11/2014 | Factor et al. |
| 2014/0331222 A1 | 11/2014 | Zheng |
| 2014/0337953 A1 | 11/2014 | Banatwala et al. |
| 2014/0344457 A1 | 11/2014 | Bruno, Jr. et al. |
| 2014/0344736 A1 | 11/2014 | Ryman et al. |
| 2014/0351674 A1 | 11/2014 | Grube et al. |
| 2014/0359093 A1 | 12/2014 | Raju et al. |
| 2014/0359608 A1 | 12/2014 | Tsirkin et al. |
| 2014/0365781 A1 | 12/2014 | Dmitrienko et al. |
| 2014/0372489 A1 | 12/2014 | Jaiswal et al. |
| 2014/0372533 A1 | 12/2014 | Fu et al. |
| 2014/0380085 A1 | 12/2014 | Rash et al. |
| 2015/0006487 A1 | 1/2015 | Yang et al. |
| 2015/0025989 A1 | 1/2015 | Dunstan |
| 2015/0033241 A1 | 1/2015 | Jackson et al. |
| 2015/0039891 A1 | 2/2015 | Ignatchenko et al. |
| 2015/0040229 A1 | 2/2015 | Chan et al. |
| 2015/0046926 A1 | 2/2015 | Kenchammana-Hosekote et al. |
| 2015/0046971 A1 | 2/2015 | Huh et al. |
| 2015/0052258 A1 | 2/2015 | Johnson et al. |
| 2015/0058914 A1 | 2/2015 | Yadav |
| 2015/0067019 A1 | 3/2015 | Balko |
| 2015/0067830 A1 | 3/2015 | Johansson et al. |
| 2015/0074659 A1 | 3/2015 | Madsen et al. |
| 2015/0074661 A1 | 3/2015 | Kothari et al. |
| 2015/0074662 A1 | 3/2015 | Saladi et al. |
| 2015/0074675 A1 | 3/2015 | Qi et al. |
| 2015/0081885 A1 | 3/2015 | Thomas et al. |
| 2015/0095822 A1 | 4/2015 | Feis et al. |
| 2015/0106805 A1 | 4/2015 | Melander et al. |
| 2015/0120928 A1 | 4/2015 | Gummaraju et al. |
| 2015/0121391 A1 | 4/2015 | Wang |
| 2015/0134626 A1 | 5/2015 | Theimer et al. |
| 2015/0135287 A1 | 5/2015 | Medeiros et al. |
| 2015/0142747 A1 | 5/2015 | Zou |
| 2015/0142952 A1 | 5/2015 | Bragstad et al. |
| 2015/0143374 A1 | 5/2015 | Banga et al. |
| 2015/0143381 A1 | 5/2015 | Chin et al. |
| 2015/0146716 A1 | 5/2015 | Olivier et al. |
| 2015/0154046 A1 | 6/2015 | Farkas et al. |
| 2015/0161384 A1 | 6/2015 | Gu et al. |
| 2015/0163231 A1 | 6/2015 | Sobko et al. |
| 2015/0178019 A1 | 6/2015 | Hegdal et al. |
| 2015/0178110 A1 | 6/2015 | Li et al. |
| 2015/0186129 A1 | 7/2015 | Apte et al. |
| 2015/0188775 A1 | 7/2015 | Van Der Walt et al. |
| 2015/0199218 A1 | 7/2015 | Wilson et al. |
| 2015/0205596 A1 | 7/2015 | Hiltegen et al. |
| 2015/0206139 A1 | 7/2015 | Lea |
| 2015/0212818 A1 | 7/2015 | Gschwind et al. |
| 2015/0227598 A1 | 8/2015 | Hahn et al. |
| 2015/0229645 A1 | 8/2015 | Keith et al. |
| 2015/0235144 A1 | 8/2015 | Gusev et al. |
| 2015/0242225 A1 | 8/2015 | Muller et al. |
| 2015/0254248 A1 | 9/2015 | Burns et al. |
| 2015/0256514 A1 | 9/2015 | Laivand et al. |
| 2015/0256621 A1 | 9/2015 | Noda et al. |
| 2015/0261578 A1 | 9/2015 | Greden et al. |
| 2015/0264014 A1 | 9/2015 | Budhani et al. |
| 2015/0269494 A1 | 9/2015 | Kardes et al. |
| 2015/0271073 A1 | 9/2015 | Saladi et al. |

(56) References Cited

U.S. PATENT DOCUMENTS

| | | |
|---|---|---|
| 2015/0271280 A1 | 9/2015 | Zhang et al. |
| 2015/0289220 A1 | 10/2015 | Kim et al. |
| 2015/0309923 A1 | 10/2015 | Iwata et al. |
| 2015/0319160 A1 | 11/2015 | Ferguson et al. |
| 2015/0319174 A1 | 11/2015 | Hayton et al. |
| 2015/0324174 A1 | 11/2015 | Bromley et al. |
| 2015/0324182 A1 | 11/2015 | Barros et al. |
| 2015/0324210 A1 | 11/2015 | Carlson |
| 2015/0324229 A1 | 11/2015 | Valine |
| 2015/0332048 A1 | 11/2015 | Mooring et al. |
| 2015/0332195 A1 | 11/2015 | Jue |
| 2015/0334173 A1 | 11/2015 | Coulmeau et al. |
| 2015/0350701 A1 | 12/2015 | Lemus et al. |
| 2015/0356294 A1 | 12/2015 | Tan et al. |
| 2015/0363181 A1 | 12/2015 | Alberti et al. |
| 2015/0363304 A1 | 12/2015 | Nagamalla et al. |
| 2015/0370560 A1 | 12/2015 | Tan et al. |
| 2015/0370591 A1 | 12/2015 | Tuch et al. |
| 2015/0370592 A1 | 12/2015 | Tuch et al. |
| 2015/0371244 A1 | 12/2015 | Neuse et al. |
| 2015/0378762 A1 | 12/2015 | Saladi et al. |
| 2015/0378764 A1 | 12/2015 | Sivasubramanian et al. |
| 2015/0378765 A1 | 12/2015 | Singh et al. |
| 2015/0379167 A1 | 12/2015 | Griffith et al. |
| 2016/0011901 A1 | 1/2016 | Hurwitz et al. |
| 2016/0012099 A1 | 1/2016 | Tuatini et al. |
| 2016/0019081 A1 | 1/2016 | Chandrasekaran et al. |
| 2016/0019082 A1 | 1/2016 | Chandrasekaran et al. |
| 2016/0019536 A1 | 1/2016 | Ortiz et al. |
| 2016/0021112 A1 | 1/2016 | Katieb |
| 2016/0026486 A1 | 1/2016 | Abdallah |
| 2016/0048606 A1 | 2/2016 | Rubinstein et al. |
| 2016/0070714 A1 | 3/2016 | D'Sa et al. |
| 2016/0072727 A1 | 3/2016 | Leafe et al. |
| 2016/0072781 A1 | 3/2016 | Zhang et al. |
| 2016/0077901 A1 | 3/2016 | Roth et al. |
| 2016/0092320 A1 | 3/2016 | Baca |
| 2016/0092493 A1 | 3/2016 | Ko et al. |
| 2016/0098285 A1 | 4/2016 | Davis et al. |
| 2016/0100036 A1 | 4/2016 | Lo et al. |
| 2016/0103739 A1 | 4/2016 | Huang et al. |
| 2016/0110188 A1 | 4/2016 | Verde et al. |
| 2016/0117163 A1 | 4/2016 | Fukui et al. |
| 2016/0117254 A1 | 4/2016 | Susarla et al. |
| 2016/0119289 A1 | 4/2016 | Jain et al. |
| 2016/0124665 A1 | 5/2016 | Jain et al. |
| 2016/0124978 A1 | 5/2016 | Nithrakashyap et al. |
| 2016/0140180 A1 | 5/2016 | Park et al. |
| 2016/0150053 A1 | 5/2016 | Janczuk et al. |
| 2016/0188367 A1 | 6/2016 | Zeng |
| 2016/0191420 A1 | 6/2016 | Nagarajan et al. |
| 2016/0198235 A1 | 7/2016 | Liu et al. |
| 2016/0203219 A1 | 7/2016 | Hoch et al. |
| 2016/0212007 A1 | 7/2016 | Alatorre et al. |
| 2016/0226955 A1 | 8/2016 | Moorthi et al. |
| 2016/0282930 A1 | 9/2016 | Ramachandran et al. |
| 2016/0285906 A1 | 9/2016 | Fine et al. |
| 2016/0292016 A1 | 10/2016 | Bussard et al. |
| 2016/0294614 A1 | 10/2016 | Searle et al. |
| 2016/0306613 A1 | 10/2016 | Busi et al. |
| 2016/0315910 A1 | 10/2016 | Kaufman |
| 2016/0350099 A1 | 12/2016 | Suparna et al. |
| 2016/0350124 A1 | 12/2016 | Gschwind et al. |
| 2016/0357536 A1 | 12/2016 | Firlik et al. |
| 2016/0364265 A1 | 12/2016 | Cao et al. |
| 2016/0364316 A1 | 12/2016 | Bhat et al. |
| 2016/0371127 A1 | 12/2016 | Antony et al. |
| 2016/0371156 A1 | 12/2016 | Merriman |
| 2016/0378449 A1 | 12/2016 | Khazanchi et al. |
| 2016/0378525 A1 | 12/2016 | Bjorkengren |
| 2016/0378547 A1 | 12/2016 | Brouwer et al. |
| 2016/0378554 A1 | 12/2016 | Gummaraju et al. |
| 2017/0004169 A1 | 1/2017 | Merrill et al. |
| 2017/0032000 A1 | 2/2017 | Sharma et al. |
| 2017/0041144 A1 | 2/2017 | Krapf et al. |
| 2017/0041309 A1 | 2/2017 | Ekambaram et al. |
| 2017/0060610 A1 | 3/2017 | Klee et al. |
| 2017/0060615 A1 | 3/2017 | Thakkar et al. |
| 2017/0060621 A1 | 3/2017 | Whipple et al. |
| 2017/0068574 A1 | 3/2017 | Cherkasova et al. |
| 2017/0075749 A1 | 3/2017 | Ambichl et al. |
| 2017/0083381 A1 | 3/2017 | Cong et al. |
| 2017/0085447 A1 | 3/2017 | Chen et al. |
| 2017/0085502 A1 | 3/2017 | Biruduraju |
| 2017/0085591 A1 | 3/2017 | Ganda et al. |
| 2017/0091235 A1 | 3/2017 | Yammine et al. |
| 2017/0091296 A1 | 3/2017 | Beard et al. |
| 2017/0093684 A1 | 3/2017 | Jayaraman et al. |
| 2017/0093920 A1 | 3/2017 | Ducatel et al. |
| 2017/0118247 A1 | 4/2017 | Hussain et al. |
| 2017/0134519 A1 | 5/2017 | Chen et al. |
| 2017/0142099 A1 | 5/2017 | Hinohara et al. |
| 2017/0147656 A1 | 5/2017 | Choudhary et al. |
| 2017/0149740 A1 | 5/2017 | Mansour et al. |
| 2017/0153965 A1 | 6/2017 | Nitta et al. |
| 2017/0161059 A1 | 6/2017 | Wood et al. |
| 2017/0177266 A1 | 6/2017 | Doerner et al. |
| 2017/0177441 A1 | 6/2017 | Chow |
| 2017/0177854 A1 | 6/2017 | Gligor et al. |
| 2017/0188213 A1 | 6/2017 | Nirantar et al. |
| 2017/0192825 A1 | 7/2017 | Biberman et al. |
| 2017/0221000 A1 | 8/2017 | Anand |
| 2017/0230262 A1 | 8/2017 | Sreeramoju et al. |
| 2017/0230499 A1 | 8/2017 | Mumick et al. |
| 2017/0249130 A1 | 8/2017 | Smiljamic et al. |
| 2017/0264681 A1 | 9/2017 | Apte et al. |
| 2017/0272462 A1 | 9/2017 | Kraemer et al. |
| 2017/0286187 A1 | 10/2017 | Chen et al. |
| 2017/0288878 A1 | 10/2017 | Lee et al. |
| 2017/0308520 A1 | 10/2017 | Beahan, Jr. et al. |
| 2017/0315163 A1 | 11/2017 | Wang et al. |
| 2017/0322824 A1 | 11/2017 | Reuther et al. |
| 2017/0329578 A1 | 11/2017 | Iscen |
| 2017/0346808 A1 | 11/2017 | Anzai et al. |
| 2017/0353851 A1 | 12/2017 | Gonzalez et al. |
| 2017/0364345 A1 | 12/2017 | Fontoura et al. |
| 2017/0371720 A1 | 12/2017 | Basu et al. |
| 2017/0372142 A1 | 12/2017 | Bilobrov |
| 2018/0004555 A1 | 1/2018 | Ramanathan et al. |
| 2018/0004556 A1 | 1/2018 | Marriner et al. |
| 2018/0004575 A1 | 1/2018 | Marriner et al. |
| 2018/0032410 A1 | 2/2018 | Kang et al. |
| 2018/0046453 A1 | 2/2018 | Nair et al. |
| 2018/0046482 A1 | 2/2018 | Karve et al. |
| 2018/0060132 A1 | 3/2018 | Maru et al. |
| 2018/0060221 A1 | 3/2018 | Yim et al. |
| 2018/0060318 A1 | 3/2018 | Yang et al. |
| 2018/0067841 A1 | 3/2018 | Mahimkar |
| 2018/0067873 A1 | 3/2018 | Pikhur et al. |
| 2018/0069702 A1 | 3/2018 | Ayyadevara et al. |
| 2018/0081717 A1 | 3/2018 | Li |
| 2018/0089232 A1 | 3/2018 | Spektor et al. |
| 2018/0095738 A1 | 4/2018 | Dürkop et al. |
| 2018/0113770 A1 | 4/2018 | Hasanov et al. |
| 2018/0113793 A1 | 4/2018 | Fink et al. |
| 2018/0121665 A1 | 5/2018 | Anderson et al. |
| 2018/0129684 A1 | 5/2018 | Wilson et al. |
| 2018/0144263 A1 | 5/2018 | Saxena et al. |
| 2018/0150339 A1 | 5/2018 | Pan et al. |
| 2018/0152401 A1 | 5/2018 | Tandon et al. |
| 2018/0152405 A1 | 5/2018 | Kuo et al. |
| 2018/0152406 A1 | 5/2018 | Kuo et al. |
| 2018/0165110 A1 | 6/2018 | Htay |
| 2018/0192101 A1 | 7/2018 | Bilobrov |
| 2018/0225096 A1 | 8/2018 | Mishra et al. |
| 2018/0227300 A1 | 8/2018 | Nakic et al. |
| 2018/0239636 A1 | 8/2018 | Arora et al. |
| 2018/0253333 A1 | 9/2018 | Gupta |
| 2018/0255137 A1 | 9/2018 | Hu et al. |
| 2018/0268130 A1 | 9/2018 | Ghosh et al. |
| 2018/0275987 A1 | 9/2018 | Vandeputte |
| 2018/0285101 A1 | 10/2018 | Yahav et al. |
| 2018/0300111 A1 | 10/2018 | Bhat et al. |
| 2018/0314845 A1 | 11/2018 | Anderson et al. |

(56) References Cited

U.S. PATENT DOCUMENTS

| | | |
|---|---|---|
| 2018/0316552 A1 | 11/2018 | Subramani Nadar et al. |
| 2018/0341504 A1 | 11/2018 | Kissell |
| 2018/0365422 A1 | 12/2018 | Callaghan et al. |
| 2018/0367517 A1 | 12/2018 | Tus |
| 2018/0375781 A1 | 12/2018 | Chen et al. |
| 2019/0004866 A1 | 1/2019 | Du et al. |
| 2019/0018715 A1 | 1/2019 | Behrendt et al. |
| 2019/0028552 A1 | 1/2019 | Johnson, II et al. |
| 2019/0034095 A1 | 1/2019 | Singh et al. |
| 2019/0043231 A1 | 2/2019 | Uzgin et al. |
| 2019/0068622 A1 | 2/2019 | Lin et al. |
| 2019/0072529 A1 | 3/2019 | Andrawes et al. |
| 2019/0073430 A1 | 3/2019 | Webster |
| 2019/0079751 A1 | 3/2019 | Foskett et al. |
| 2019/0102278 A1 | 4/2019 | Gahlin et al. |
| 2019/0140831 A1 | 5/2019 | De Lima Junior et al. |
| 2019/0141015 A1 | 5/2019 | Nellen |
| 2019/0147085 A1 | 5/2019 | Pal et al. |
| 2019/0147515 A1 | 5/2019 | Hurley et al. |
| 2019/0149480 A1 | 5/2019 | Singvhi |
| 2019/0171423 A1 | 6/2019 | Mishra et al. |
| 2019/0179678 A1 | 6/2019 | Banerjee et al. |
| 2019/0179725 A1 | 6/2019 | Mital et al. |
| 2019/0180036 A1 | 6/2019 | Shukla |
| 2019/0188288 A1 | 6/2019 | Holm et al. |
| 2019/0196884 A1 | 6/2019 | Wagner |
| 2019/0235848 A1 | 8/2019 | Swiecki et al. |
| 2019/0238590 A1 | 8/2019 | Talukdar et al. |
| 2019/0250937 A1 | 8/2019 | Thomas et al. |
| 2019/0268152 A1 | 8/2019 | Sandoval et al. |
| 2019/0278938 A1 | 9/2019 | Greene et al. |
| 2019/0286475 A1 | 9/2019 | Mani |
| 2019/0286492 A1 | 9/2019 | Gulsvig Wood et al. |
| 2019/0303117 A1 | 10/2019 | Kocberber et al. |
| 2019/0306692 A1 | 10/2019 | Garty et al. |
| 2019/0311115 A1 | 10/2019 | Lavi et al. |
| 2019/0318312 A1 | 10/2019 | Foskett et al. |
| 2019/0320038 A1 | 10/2019 | Walsh et al. |
| 2019/0324813 A1 | 10/2019 | Bogineni et al. |
| 2019/0339955 A1 | 11/2019 | Kuo et al. |
| 2019/0361802 A1 | 11/2019 | Li et al. |
| 2019/0363885 A1 | 11/2019 | Schiavoni et al. |
| 2019/0370113 A1 | 12/2019 | Zhang et al. |
| 2020/0007456 A1 | 1/2020 | Greenstein et al. |
| 2020/0026527 A1 | 1/2020 | Xu et al. |
| 2020/0028936 A1 | 1/2020 | Gupta et al. |
| 2020/0034471 A1 | 1/2020 | Danilov et al. |
| 2020/0065079 A1 | 2/2020 | Kocberber et al. |
| 2020/0073770 A1 | 3/2020 | Mortimore, Jr. et al. |
| 2020/0073987 A1 | 3/2020 | Perumala et al. |
| 2020/0081745 A1 | 3/2020 | Cybulski et al. |
| 2020/0110691 A1 | 4/2020 | Bryant et al. |
| 2020/0120120 A1 | 4/2020 | Cybulski |
| 2020/0134030 A1 | 4/2020 | Natanzon et al. |
| 2020/0136933 A1 | 4/2020 | Raskar |
| 2020/0153798 A1 | 5/2020 | Liebherr |
| 2020/0153897 A1 | 5/2020 | Mestery et al. |
| 2020/0167208 A1 | 5/2020 | Floes et al. |
| 2020/0186445 A1 | 6/2020 | Govindaraju et al. |
| 2020/0192646 A1 | 6/2020 | Yerramreddy et al. |
| 2020/0213151 A1 | 7/2020 | Srivatsan et al. |
| 2020/0241930 A1 | 7/2020 | Garg et al. |
| 2020/0327236 A1 | 10/2020 | Pratt et al. |
| 2020/0341799 A1 | 10/2020 | Wagner et al. |
| 2020/0348979 A1 | 11/2020 | Calmon |
| 2020/0349067 A1 | 11/2020 | Syamala et al. |
| 2020/0366587 A1 | 11/2020 | White et al. |
| 2020/0401455 A1 | 12/2020 | Church et al. |
| 2020/0412538 A1 | 12/2020 | Rosado |
| 2021/0019056 A1 | 1/2021 | Mangione-Tran |
| 2021/0042160 A1 | 2/2021 | Alamouti et al. |
| 2021/0081233 A1 | 3/2021 | Mullen et al. |
| 2021/0117217 A1 | 4/2021 | Croteau et al. |
| 2021/0117534 A1 | 4/2021 | Maximov et al. |
| 2021/0124822 A1 | 4/2021 | Tiwary et al. |
| 2021/0176333 A1 | 6/2021 | Coleman et al. |
| 2021/0233045 A1 | 7/2021 | Singh et al. |
| 2021/0294646 A1 | 9/2021 | Hassaan et al. |
| 2021/0303720 A1 | 9/2021 | Creenaune et al. |
| 2021/0314250 A1 | 10/2021 | Laplante et al. |
| 2021/0342145 A1 | 11/2021 | Miller et al. |
| 2021/0342329 A1 | 11/2021 | Padmanabhan |
| 2021/0389963 A1 | 12/2021 | Wagner |
| 2022/0004423 A1 | 1/2022 | Brooker et al. |
| 2022/0012083 A1 | 1/2022 | Brooker et al. |
| 2022/0200993 A1 | 6/2022 | Smith |
| 2022/0201041 A1 | 6/2022 | Keiser, Jr. et al. |
| 2022/0214863 A1 | 7/2022 | Clement et al. |
| 2023/0024699 A1 | 1/2023 | Bayoumi et al. |
| 2023/0188516 A1 | 6/2023 | Danilov |
| 2024/0220305 A1 | 7/2024 | Mullet et al. |

FOREIGN PATENT DOCUMENTS

| | | |
|---|---|---|
| CA | 2 962 631 C | 10/2023 |
| CN | 1341238 A | 3/2002 |
| CN | 101002170 A | 7/2007 |
| CN | 101267334 A | 9/2008 |
| CN | 101345757 A | 1/2009 |
| CN | 101496005 A | 7/2009 |
| CN | 101627388 A | 1/2010 |
| CN | 101640700 A | 2/2010 |
| CN | 101764824 A | 6/2010 |
| CN | 102171712 A | 8/2011 |
| CN | 102246152 A | 11/2011 |
| CN | 102365858 A | 2/2012 |
| CN | 102420846 A | 4/2012 |
| CN | 102761549 A | 10/2012 |
| CN | 103098027 A | 5/2013 |
| CN | 103140828 A | 6/2013 |
| CN | 103384237 A | 11/2013 |
| CN | 103731427 A | 4/2014 |
| CN | 104111848 A | 10/2014 |
| CN | 104160378 A | 11/2014 |
| CN | 104243479 A | 12/2014 |
| CN | 104903854 A | 9/2015 |
| CN | 105956000 A | 9/2016 |
| CN | 106921651 A | 7/2017 |
| CN | 107533472 A | 1/2018 |
| CN | 107534672 A | 1/2018 |
| CN | 108885568 A | 11/2018 |
| CN | 109478134 A | 3/2019 |
| CN | 109564525 A | 4/2019 |
| CN | 112513813 A | 3/2021 |
| CN | 109564525 B | 5/2023 |
| EP | 2663052 A1 | 11/2013 |
| EP | 3201762 A1 | 8/2017 |
| EP | 3254434 A1 | 12/2017 |
| EP | 3356938 A1 | 8/2018 |
| EP | 3201768 B1 | 12/2019 |
| EP | 3811209 A1 | 4/2021 |
| EP | 3814895 A1 | 5/2021 |
| EP | 3857375 A1 | 8/2021 |
| EP | 4064052 A1 | 9/2022 |
| JP | 2002-287974 A | 10/2002 |
| JP | 2006-107599 A | 4/2006 |
| JP | 2007-080161 A | 3/2007 |
| JP | 2007-538323 A | 12/2007 |
| JP | 2010-026562 A | 2/2010 |
| JP | 2011-065243 A | 3/2011 |
| JP | 2011-233146 A | 11/2011 |
| JP | 2011-257847 A | 12/2011 |
| JP | 2012-078893 A | 4/2012 |
| JP | 2012-104150 A | 5/2012 |
| JP | 2013-156996 A | 8/2013 |
| JP | 2014-525624 A | 9/2014 |
| JP | 2016-507100 A | 3/2016 |
| JP | 2017-534107 A | 11/2017 |
| JP | 2017-534967 A | 11/2017 |
| JP | 2018-503896 A | 2/2018 |
| JP | 2018-512087 A | 5/2018 |
| JP | 2018-536213 A | 12/2018 |
| JP | 7197612 B2 | 12/2022 |
| JP | 7210713 B2 | 1/2023 |

(56) References Cited

FOREIGN PATENT DOCUMENTS

| | | |
|---|---|---|
| KR | 10-357850 B1 | 10/2002 |
| KR | 10-2021-0019533 A | 2/2021 |
| WO | WO 2008/114454 A1 | 9/2008 |
| WO | WO 2009/137567 A1 | 11/2009 |
| WO | WO 2012/039834 A1 | 3/2012 |
| WO | WO 2012/050772 A1 | 4/2012 |
| WO | WO 2013/106257 A1 | 7/2013 |
| WO | WO 2015/078394 A1 | 6/2015 |
| WO | WO 2015/108539 A1 | 7/2015 |
| WO | WO 2015/149017 A1 | 10/2015 |
| WO | WO 2016/053950 A1 | 4/2016 |
| WO | WO 2016/053968 A1 | 4/2016 |
| WO | WO 2016/053973 A1 | 4/2016 |
| WO | WO 2016/090292 A1 | 6/2016 |
| WO | WO 2016/126731 A1 | 8/2016 |
| WO | WO 2016/164633 A1 | 10/2016 |
| WO | WO 2016/164638 A1 | 10/2016 |
| WO | WO 2017/059248 A1 | 4/2017 |
| WO | WO 2017/112526 A1 | 6/2017 |
| WO | WO 2017/172440 A1 | 10/2017 |
| WO | WO 2018/005500 A1 | 1/2018 |
| WO | WO 2018/005829 A1 | 1/2018 |
| WO | WO 2018/098443 A1 | 5/2018 |
| WO | WO 2018/098445 A1 | 5/2018 |
| WO | WO 2020/005764 A1 | 1/2020 |
| WO | WO 2020/006081 A1 | 1/2020 |
| WO | WO 2020/069104 A1 | 4/2020 |
| WO | WO 2020/123439 A1 | 6/2020 |
| WO | WO 2020/264431 A1 | 12/2020 |
| WO | WO 2021/108435 A1 | 6/2021 |
| WO | WO 2023/107649 A1 | 6/2023 |

OTHER PUBLICATIONS

Dornemann et al., "On-Demand Resource Provisioning for BPEL Workflows Using Amazon's Elastic Compute Cloud", 9th IEEE/ACM International Symposium on Cluster Computing and the Grid, 2009, pp. 140-147.
Huang et al., "Erasure Coding in Windows Azure Storege", USENIX, 2012 in 12 pages.
Rashmi et al., "EC-Cache: Load-Balance, Low-Latency Cluster Caching with Online Erasure Coding", USENIX, 2016, pp. 401-417.
Office Action in Chinese Application No. 202110268031.5, dated Sep. 3, 2021.
Office Action in European Application No. 19199402.9 dated Dec. 3, 2021 in 4 pages.
Communication Pursuant to Article 94(3) EPC in European Application No. 19199402.9 dated Apr. 19, 2022 in 5 pages.
Office Action in Chinese Application No. 201680020768.2 dated Sep. 24, 2021 in 20 pages.
Decision to refuse a European Patent Application in European Patent Application No. 16716797.2 dated Dec. 20, 2021 in 20 pages.
Office Action in European Application No. 16823419.3 dated May 20, 2022 in 6 pages.
Second Office Action in Chinese Application No. 2017800451968 dated Dec. 3, 2021 in 20 pages.
Office Action in European Application No. 19740451.0 dated Jun. 13, 2022 in 4 pages.
Office Action in Japanese Application No. 2020-572443 dated Feb. 28, 2022.
Office Action in Korean Application No. 10-2021-7000975 dated Mar. 31, 2022 in 12 pages.
Office Action in Japanese Application No. 2020-572441 dated Dec. 22, 2021 in 8 pages.
Office Action in Japanese Application No. 2021-517335 dated May 16, 2022.
International Preliminary Report on Patentability for Application No. PCT/US2020/039996 dated Jan. 6, 2022.
International Preliminary Report on Patentability for Application No. PCT/US2020/062060 dated Jun. 9, 2022 in 9 pages.

Anonymous: "Docker run reference", Dec. 7, 2015, XP055350246, Retrieved from the Internet: URL:https://web.archive.org/web/20151207111702/https://docs.docker.com/engine/reference/run/ [retrieved on Feb. 28, 2017].
Adapter Pattern, Wikipedia, https://en.wikipedia.org/w/index.php?title=Adapter_pattern&oldid=654971255, [retrieved May 26, 2016], 6 pages.
Amazon, "AWS Lambda: Developer Guide", Jun. 26, 2016 Retrieved from the Internet, URL:http://docs.aws.amazon.com/lambda/latest/dg/lambda-dg.pdf, [retrieved on Aug. 30, 2017], 314 pages.
Amazon, "AWS Lambda: Developer Guide", Apr. 30, 2016 Retrieved from the Internet, URL: https://web.archive.org/web/20160430050158/http://docs.aws.amazon.com:80/lambda/latest/dg/lambda-dg.pdf, 346 pages.
Amazon, "AWS Lambda: Developer Guide", Retrieved from the Internet, 2019, URL : http://docs.aws.amazon.com/lambda/ latest/dg/lambda-dg.pdf, 521 pages.
Balazinska et al., Moirae: History-Enhanced Monitoring, Published: Jan. 2007, 12 pages.
Bebenita et al., "Trace-Based Compilation in Execution Environments without Interpreters," ACM, Copyright 2010, 10 pages.
Ben-Yehuda et al., "Deconstructing Amazon EC2 Spot Instance Pricing", ACM Transactions on Economics and Computation 1.3, Sep. 2013, 15 pages.
Bhadani et al., Performance evaluation of web servers using central load balancing policy over virtual machines on cloud, Jan. 2010, 4 pages.
Bryan Liston, "Ad Hoc Big Data Processing Made Simple with Serverless Map Reduce", Nov. 4, 2016, Amazon Web Services <https ://aws. amazon .com/bl ogs/compute/ad-hoc-big-data-processi ng-made-si mple-with-serverless-mapred uce >.
CodeChef Admin discussion web page, retrieved from https://discuss.codechef.com/t/what-are-the-memory-limit-and-stack-size-on-codechef/14159, retrieved on Sep. 10, 2019.
CodeChef IDE web page, Code, Compile & Run, retrieved from https://www.codechef.com/ide, retrieved on Sep. 9, 2019.
Czajkowski, G., and L. Daynes, Multitasking Without Compromise: A Virtual Machine Evolution 47(4a):60-73, ACM SIGPLAN Notices—Supplemental Issue, Apr. 2012.
Das et al., Adaptive Stream Processing using Dynamic Batch Sizing, Nov. 2014, 13 pages.
Deis, Container, Jun. 2014, 1 page.
Dean et al, "MapReduce: Simplified Data Processing on Large Clusters", ACM, 2008, pp. 107-113.
Dombrowski, M., et al., Dynamic Monitor Allocation in the Java Virtual Machine, JTRES '13, Oct. 9-11, 2013, pp. 30-37.
Dynamic HTML, Wikipedia page from date Mar. 27, 2015, retrieved using the WayBackMachine, from https://web.archive.org/web/20150327215418/https://en.wikipedia.org/wiki/Dynamic_HTML, 2015, 6 pages.
Ekanayake et al, "Twister: A Runtime for Iterative MapReduce", ACM, 2010, pp. 810-818.
Espadas, J., et al., A Tenant-Based Resource Allocation Model for Scaling Software-as-a-Service Applications Over Cloud Computing Infrastructures, Future Generation Computer Systems, vol. 29, pp. 273-286, 2013.
Fan et al., Online Optimization of VM Deployment in IaaS Cloud, Dec. 17, 2012-Dec. 19, 2012, 6 pages.
Ha et al., A Concurrent Trace-based Just-In-Time Compiler for Single-threaded JavaScript, utexas.edu, Jun. 2009.
Hammoud et al, "Locality-Aware Reduce Task Scheduling for MapReduce", IEEE, 2011, pp. 570-576.
Han et al., Lightweight Resource Scaling for Cloud Applications, May 13, 2012-May 16, 2012, 8 pages.
Hoffman, Auto scaling your website with Amazon Web Services (AWS)—Part 2, Cardinalpath, Sep. 2015, 15 pages.
http://discuss.codechef.com discussion web page from date Nov. 11, 2012, retrieved using the WayBackMachine, from https://web.archive.org/web/20121111040051/http://discuss.codechef.com/questions/2881 /why-are-simple-java-programs-using-up-so-much-space, 2012.

(56) References Cited

OTHER PUBLICATIONS https://www.codechef.com code error help page from Jan. 2014, retrieved from https://www.codechef.com/JAN14/status/ERROR, va123, 2014.
http://www.codechef.com/ide web page from date Apr. 5, 2015, retrieved using the WayBackMachine, from https://web.archive.org/web/20150405045518/http://www.codechef.com/ide, 2015.
Huang, Zhe, Danny HK Tsang, and James She. "A virtual machine consolidation framework for mapreduce enabled computing clouds." 2012 24th International Teletraffic Congress (ITC 24). IEEE, Sep. 4, 2012-Sep. 7, 2012.
Kamga et al., Extended scheduler for efficient frequency scaling in virtualized systems, Jul. 2012, 8 pages.
Kato, et al. "Web Service Conversion Architecture of the Web Application and Evaluation"; Research Report from Information Processing Society, Apr. 3, 2006 with Machine Translation.
Kazempour et al., AASH: an asymmetry-aware scheduler for hypervisors, Jul. 2010, 12 pages.
Kim et al, "MRBench: A Benchmark for Map-Reduce Framework", IEEE, 2008, pp. 11-18.
Kraft et al., 10 performance prediction in consolidated virtualized environments, Mar. 2011, 12 pages.
Krsul et al., "VMPlants: Providing and Managing Virtual Machine Execution Environments for GridComputing", SUPERCOMPUTING, 2004. Proceedings of the ACM/IEEESC 2004 Conference Pittsburgh, PA, XP010780332, Nov. 6-12, 2004, 12 pages.
Lagar-Cavilla et al., "SnowFlock: Virtual Machine Cloning as a First-Class Cloud Primitive", ACM Transactions on Computer Systems, vol. 29, No. 1, Article 2, Publication date: Feb. 2011, in 45 pages.
Lin, "MR-Apriori: Association Rules Algorithm Based on MapReduce", IEEE, 2014, pp. 141-144.
Meng et al., Efficient resource provisioning in compute clouds via VM multiplexing, Jun. 2010, 10 pages.
Merkel, "Docker: Lightweight Linux Containers for Consistent Development and Deployment", Linux Journal, vol. 2014 Issue 239, Mar. 2014, XP055171140, 16 pages.
Monteil, Coupling profile and historical methods to predict execution time of parallel application. Parallel and Cloud Computing, Jul. 2013, <hal-01228236, pp. 81-89.
Nakajima, J., et al., Optimizing Virtual Machines Using Hybrid Virtualization, SAC '11, Mar. 21-25, 2011, TaiChung, Taiwan, pp. 573-578.
Qian, H., and D. Medhi, et al., Estimating Optimal Cost of Allocating Virtualized Resources With Dynamic Demand, ITC 2011, Sep. 2011, pp. 320-321.
Ryden et al., "Nebula: Distributed Edge Cloud for Data-Intensive Computing", IEEE, 2014, pp. 491-492.
Sakamoto, et al. "Platform for Web Services using Proxy Server"; Research Report from Information Processing Society, Mar. 22, 2002, vol. 2002, No. 31.
Search Query Report from IP.com, performed Dec. 2, 2020.
Search Query Report from IP.com, performed May 27, 2021.
Shim (computing), Wikipedia, https://en.wikipedia.org/w/index.php?title+Shim_(computing)&oldid+654971528, [retrieved on May 26, 2016], 2 pages.
Stack Overflow, Creating a database connection pool, Nov. 10, 2009, 4 pages.
Tan et al., Provisioning for large scale cloud computing services, Jun. 2012, 2 pages.
Tange, "GNU Parallel: The Command-Line Power Tool", vol. 36, No. 1, Jan. 1, 1942, pp. 42-47.
Vaghani, S.B., Virtual Machine File System, ACM SIGOPS Operating Systems Review 44(4):57-70, Dec. 2010.
Vaquero, L., et al., Dynamically Scaling Applications in the cloud, ACM SIGCOMM Computer Communication Review 41(1):45-52, Jan. 2011.
Wang et al., "Improving utilization through dynamic VM resource allocation in hybrid cloud environment", Parallel and Distributed V Systems (ICPADS), IEEE, Dec. 16, 2014-Dec. 19, 2014. Retrieved on Feb. 14, 2019, Retrieved from the internet: URL<https://ieeexplore.ieee.org/stamp/stamp.jsp?tp=&arnumber=7097814, 8 pages.
Wikipedia "API" pages from date Apr. 7, 2015, retrieved using the WayBackMachine from https://web.archive.org/web/20150407191158/https://en.wikipedia.org/wiki/Application_programming_interface.
Wikipedia List_of_HTTP status_codes web page, retrieved from https://en.wikipedia.org/wiki/List_of_HTTP status_codes, retrieved on Sep. 10, 2019.
Wikipedia Recursion web page from date Mar. 26, 2015, retrieved using the WayBackMachine, from https://web.archive.org/web/20150326230100/https://en.wikipedia.org/wiki/Recursion_(computer_science), 2015.
Wikipedia subroutine web page, retrieved from https://en.wikipedia.org/wiki/Subroutine, retrieved on Sep. 10, 2019.
Wood, Timothy, et al. "Cloud Net: dynamic pooling of cloud resources by live WAN migration of virtual Machines." ACM Sigplan Notices 46.7 (2011): 121-132. (Year: 2011).
Wu et al., HC-Midware: A Middleware to Enable High Performance Communication System Simulation in Heterogeneous Cloud, Association for Computing Machinery, Oct. 20-22, 2017, 10 pages.
Yamasaki et al. "Model-based resource selection for efficient virtual cluster deployment", Virtualization Technology in Distributed Computing, ACM, Nov. 2007, pp. 1-7.
Yang, The Application of MapReduce in the Cloud Computing:, IEEE, 2011, pp. 154-156.
Yue et al., AC 2012-4107: Using Amazon EC2 in Computer and Network Security Lab Exercises: Design, Results, and Analysis, 2012, American Society for Engineering Education, Jun. 10, 2012.
Zhang et al., VMThunder: Fast Provisioning of Large-Scale Virtual Machine Clusters, IEEE Transactions on Parallel and Distributed Systems, vol. 25, No. 12, Dec. 2014, pp. 3328-3338.
Zheng, C., and D. Thain, Integrating Containers into Workflows: A Case Study Using Makeflow, Work Queue, and Docker, VTDC '15, Jun. 15, 2015, Portland, Oregon, pp. 31-38.
International Search Report and Written Opinion in PCT/US2015/052810 dated Dec. 17, 2015.
International Preliminary Report on Patentability in PCT/US2015/052810 dated Apr. 4, 2017.
Extended Search Report in European Application No. 15846932.0 dated May 3, 2018.
Office Action in Canadian Application No. 2,962,633 dated May 21, 2020.
Office Action in Canadian Application No. 2,962,633 dated Jun. 18, 2021.
Office Action in European Application No. 19199402.9 dated Mar. 23, 2021.
International Search Report and Written Opinion in PCT/US2015/052838 dated Dec. 18, 2015.
International Preliminary Report on Patentability in PCT/US2015/052838 dated Apr. 4, 2017.
Extended Search Report in European Application No. 15847202.7 dated Sep. 9, 2018.
Extended Search Report in European Application No. 19199402.9 dated Mar. 6, 2020.
Office Action in Japanese Application No. 2017-516160 dated Jan. 15, 2018.
Notice of Allowance in Japanese Application No. 2017-516160 dated May 8, 2018.
Office Action in Canadian Application No. 2,962,631 dated May 19, 2020.
Office Action in Canadian Application No. 2,962,631 dated May 31, 2021.
Office Action in Indian Application No. 201717013356 dated Jan. 22, 2021.
Office Action in Japanese Application No. 2017-516168 dated Mar. 26, 2018.
International Search Report and Written Opinion in PCT/US2015/052833 dated Jan. 13, 2016.
International Preliminary Report on Patentability in PCT/US2015/052833 dated Apr. 4, 2017.
Extended Search Report in European Application No. 15846542.7 dated Aug. 27, 2018.

(56) References Cited

OTHER PUBLICATIONS

Office Action in Indian Application No. 201717019903 dated May 18, 2020.
International Search Report and Written Opinion in PCT/US2015/064071dated Mar. 16, 2016.
International Preliminary Report on Patentability in PCT/US2015/064071 dated Jun. 6, 2017.
Office Action in Australian Application No. 2016215438 dated Feb. 26, 2018.
Notice of Allowance in Australian Application No. 2016215438 dated Nov. 19, 2018.
Office Action in Canadian Application No. 2,975,522 dated Jun. 5, 2018.
Notice of Allowance in Canadian Application No. 2,975,522 dated Mar. 13, 2020.
Office Action in Indian Application No. 201717027369 dated May 21, 2020.
International Search Report and Written Opinion in PCT/US2016/016211 dated Apr. 13, 2016.
International Preliminary Report on Patentability in PCT/US2016/016211 dated Aug. 17, 2017.
Office Action in Chinese Application No. 201680020768.2 dated May 14, 2021 in 23 pages.
First Examination Report for Indian Application No. 201717034806 dated Jun. 25, 2020.
International Search Report and Written Opinion in PCT/US2016/026514 dated Jun. 8, 2016.
International Preliminary Report on Patentability in PCT/US2016/026514 dated Oct. 10, 2017.
International Search Report and Written Opinion in PCT/US2016/026520 dated Jul. 5, 2016.
International Preliminary Report on Patentability in PCT/US2016/026520 dated Oct. 10, 2017.
Office Action in Chinese Application No. 2016800562398 dated Jun. 18, 2021.
International Search Report and Written Opinion in PCT/US2016/054774 dated Dec. 16, 2016.
Office Action in European Application No. 16781265.0 dated Jul. 13, 2020.
Office Action in Indian Application No. 201817013748 dated Nov. 20, 2020.
International Preliminary Report on Patentability in PCT/US2016/054774 dated Apr. 3, 2018.
Office Action in Chinese Application No. 201680072794.X dated Jun. 22, 2021.
Office Action in European Application No. 16823419.3 dated Mar. 12, 2021.
International Search Report and Written Opinion in PCT/US2016/066997 dated Mar. 20, 2017.
International Preliminary Report on Patentability in PCT/US2016/066997 dated Jun. 26, 2018.
Office Action in Chinese Application No. 201780022789.2 dated Apr. 28, 2021.
Office Action in European Application No. 17776325.7 dated Apr. 12, 2021.
International Search Report and Written Opinion in PCT/US/2017/023564 dated Jun. 6, 2017.
International Preliminary Report on Patentability in PCT/US/2017/023564 dated Oct. 2, 2018.
First Office Action in Chinese Application No. 2017800451968 dated May 26, 2021.
Office Action in European Application No. 17740533.9 dated May 4, 2021.
International Search Report and Written Opinion in PCT/US2017/040054 dated Sep. 21, 2017.
International Preliminary Report on Patentability in PCT/US2017/040054 dated Jan. 1, 2019.
International Search Report and Written Opinion in PCT/US2017/039514 dated Oct. 10, 2017.
International Preliminary Report on Patentability in PCT/US2017/039514 dated Jan. 1, 2019.
Extended European Search Report in application No. 17776325.7 dated Oct. 23, 2019.
Office Action in European Application No. 17743108.7 dated Jan. 14, 2020.
Office Action in European Application No. 17743108.7 dated Dec. 22, 2020.
International Search Report and Written Opinion mailed Oct. 15, 2019 for International Application No. PCT/US2019/039246 in 16 pages.
International Preliminary Report on Patentability mailed Dec. 29, 2020 for International Application No. PCT/US2019/039246 in 8 pages.
International Search Report for Application No. PCT/US2019/038520 dated Aug. 14, 2019.
International Preliminary Report on Patentability for Application No. PCT/US2019/038520 dated Dec. 29, 2020.
International Preliminary Report on Patentability and Written Opinion in PCT/US2019/053123 dated Mar. 23, 2021.
International Search Report and Written Opinion in PCT/US2019/053123 dated Jan. 7, 2020.
International Search Report for Application No. PCT/US2019/065365 dated Mar. 19, 2020.
International Preliminary Report on Patentability for Application No. PCT/US2019/065365 dated Jun. 8, 2021.
International Search Report for Application No. PCT/US2020/039996 dated Oct. 8, 2020.
International Search Report for Application No. PCT/US2020/062060 dated Mar. 5, 2021.
Anonymous: "Amazon Elastic Compute Cloud User Guide for Linux Instances—first 400 pages of 795," Apr. 8, 2016 (Apr. 8, 2016_, XP055946665, Retrieved from the Internet: URL:https://web.archive.org/web/20160408211543if_/http://docs.aws.amazon.com/AWSEC2/latest/UserGuide/ec2-ug.pdf (retrieved on Jul. 27, 2022] 795 pages.
Anonymous: "Amazon Simple Workflow Service Developer Guide API Version Jan. 25, 2012," Jun. 11, 2016 (Jun. 11, 2016), XP055946928, Retrieved from the Internet: URL:https://web.archive.org/web/20160111075522if_/http://docs.aws.amazon.com/amazonswf/latest/developerguide/swf-dg.pdf [retrieved on Jul. 28, 2022] in 197 pages.
Anonymous: "AWS Flow Framework for Java," Apr. 7, 2016 (Apr. 7, 2016), XP055946535, Retrieved from the Internet: URL:https://web.archive.org/web/20160407214715if_/http://docs.aws.amazon.com/amazonswf/latest/awsflowguide/swf-aflow.pdf, [retrieved Jul. 27, 2022] in 139 pages.
Anonymous: SaaS Tenant Isolation Strategies Isolating Resources in a Multi-Tenant Environment,: Aug. 1, 2020, XP093030095, retrieved from the internet: URL:https://dl.awsstatic.com/whitepapers/saas-tenant-isolation-strategies.pdf [retrieved on Mar. 9, 2023] the whole document.
Anonymous: "Security Overview of AWS Lambda," Aug. 11, 2021, XP093030100, retrieved from the internet: URL:https://web.archive.org/web/20210811044132if_/https://docs.aws.amazon.com/whitepapers/latest/security-overview-aws-lambda/security-overview-aws-lambda.pdf [retrieved Mar. 9, 2023] the whole document.
Sharma A. et al., "Building a Multi-Tenant SaaS Solution Using AWS Serverless Services," Aug. 26, 2021, XP093030094, retrieved from the internet: URL:https://aws.amazon.com/blogs/apn/building-a-multi-tenant-saas-solution-using-aws-serverless-services/ [retrieved on Mar. 9, 2023] the whole document.
Anonymous: "alias (command)—Wikipedia," Jun. 28, 2016, pp. 106, XP093089956, Retrieved from the Internet: URL:https://en.wikipedia.org/w/index.php?title=Alias_(command)&oldid=727315645 [retrieved on Oct. 9, 2023.
Al-Ali, et al., Making Serverless Computing More Serverless. 2018 IEEE 11th International Conference on Cloud Computing (CLOUD). Https://ieeexplore.ieee.org/stamp/stamp.jsp?tp=&amumber=8457832 (Year: 2018).

(56) References Cited

OTHER PUBLICATIONS

Gimenez-Alventosa, et al., tAsCAAs: a Multi-Tenant Serverless Task Scheduler and Load Balancer as a Service. IEEE Access, vol. 9. https://ieeexplore.ieee.org/stamp/stamp.jsp?tp=&amumber=9528423 (Year: 2021).

IBM, what is Serverless computing, https://www.IBM.com/topics/serverless#:-:test=Serverless%20is%20a%20cloud%20computing,managing%20servers%20or%20backend%20infrastructure, pp. 1-11 (Year: 2023).

Khedekar, et al., Multi-Tenant Big Data Analytics on AWS Cloud Platform. 2020 10th Annual Computing and Communication Workshop and Conference (CCWC). Https://ieeexplore.ieee.org/stamp/staum.jsp?tp=&amumber=9031133 (Year: 2020).

Neenan, Sarah Compare Serverless tools and services in the Public cloud, https://www.techtarget.com/searchcloudcomputing/feature/Compare-serverless-tools-and-services-in-the-public-cloud, TechTarget, pp. 1-4 (Year: 2023).

Wikipedia: Serverless computing, https://en.wikipedia.org/wiki/Serverless_computing, pp. 107 (Year: 2023).

Zheng, et al., "A Multi-Tenant Framework for Cloud Container Services," 2021 IEEE 41st International Conference on Distributed Computer Systems (ICDCS). Https://ieeexplore.ieee.org/stamp/stamp.jsp?tp=&amumber=9546534 (Year: 2021).

\* cited by examiner

FIG. 5

| LATENCY PERFORMANCE | | USER CODE LOCATION | | |
|---|---|---|---|---|
| | | CONTAINER | INSTANCE | EXTERNAL SERVICE |
| INSTANCE LOCATION | ACTIVE POOL | BEST CASE | | |
| | WARMING POOL | | | |
| | CREATION NEEDED | | | WORST CASE |

LOW LATENCY COMPUTATIONAL CAPACITY PROVISIONING

RELATED APPLICATIONS

This application is a continuation of U.S. application Ser. No. 16/165,492, filed Oct. 19, 2018 and titled "LOW LATENCY COMPUTATIONAL CAPACITY PROVISIONING," which is a continuation of U.S. application Ser. No. 15/468,724, filed Mar. 24, 2017 and titled "LOW LATENCY COMPUTATIONAL CAPACITY PROVISIONING," which is a continuation of U.S. application Ser. No. 14/502,810, filed Sep. 30, 2014 and titled "LOW LATENCY COMPUTATIONAL CAPACITY PROVISIONING." Any and all applications for which a foreign or domestic priority claim is identified in the Application Data Sheet of the present application are hereby incorporated by reference under 37 CFR 1.57 in their entireties.

The present application's Applicant previously filed the following U.S. patent applications on Sep. 30, 2014, the disclosures of which are hereby incorporated by reference in their entireties:

| U.S. Application No. | Title |
| --- | --- |
| 14/502,589 | MESSAGE-BASED COMPUTATION REQUEST SCHEDULING |
| 14/502,714 | AUTOMATIC MANAGEMENT OF LOW LATENCY COMPUTATIONAL CAPACITY |
| 14/502,992 | THREADING AS A SERVICE |
| 14/502,648 | PROGRAMMATIC EVENT DETECTION AND MESSAGE GENERATION FOR REQUESTS TO EXECUTE PROGRAM CODE |
| 14/502,741 | PROCESSING EVENT MESSAGES FOR USER REQUESTS TO EXECUTE PROGRAM CODE |
| 14/502,620 | DYNAMIC CODE DEPLOYMENT AND VERSIONING |

BACKGROUND

Generally described, computing devices utilize a communication network, or a series of communication networks, to exchange data. Companies and organizations operate computer networks that interconnect a number of computing devices to support operations or provide services to third parties. The computing systems can be located in a single geographic location or located in multiple, distinct geographic locations (e.g., interconnected via private or public communication networks). Specifically, data centers or data processing centers, herein generally referred to as a "data center," may include a number of interconnected computing systems to provide computing resources to users of the data center. The data centers may be private data centers operated on behalf of an organization or public data centers operated on behalf, or for the benefit of, the general public.

To facilitate increased utilization of data center resources, virtualization technologies may allow a single physical computing device to host one or more instances of virtual machines that appear and operate as independent computing devices to users of a data center. With virtualization, the single physical computing device can create, maintain, delete, or otherwise manage virtual machines in a dynamic manner. In turn, users can request computer resources from a data center, including single computing devices or a configuration of networked computing devices, and be provided with varying numbers of virtual machine resources.

In some scenarios, virtual machine instances may be configured according to a number of virtual machine instance types to provide specific functionality. For example, various computing devices may be associated with different combinations of operating systems or operating system configurations, virtualized hardware resources and software applications to enable a computing device to provide different desired functionalities, or to provide similar functionalities more efficiently. These virtual machine instance type configurations are often contained within a device image, which includes static data containing the software (e.g., the OS and applications together with their configuration and data files, etc.) that the virtual machine will run once started. The device image is typically stored on the disk used to create or initialize the instance. Thus, a computing device may process the device image in order to implement the desired software configuration.

BRIEF DESCRIPTION OF THE DRAWINGS

The foregoing aspects and many of the attendant advantages of this disclosure will become more readily appreciated as the same become better understood by reference to the following detailed description, when taken in conjunction with the accompanying drawings, wherein:

FIG. 5 illustrates an example table illustrating the various scenarios encountered by a virtual compute system manager.

DETAILED DESCRIPTION

Figure 1:
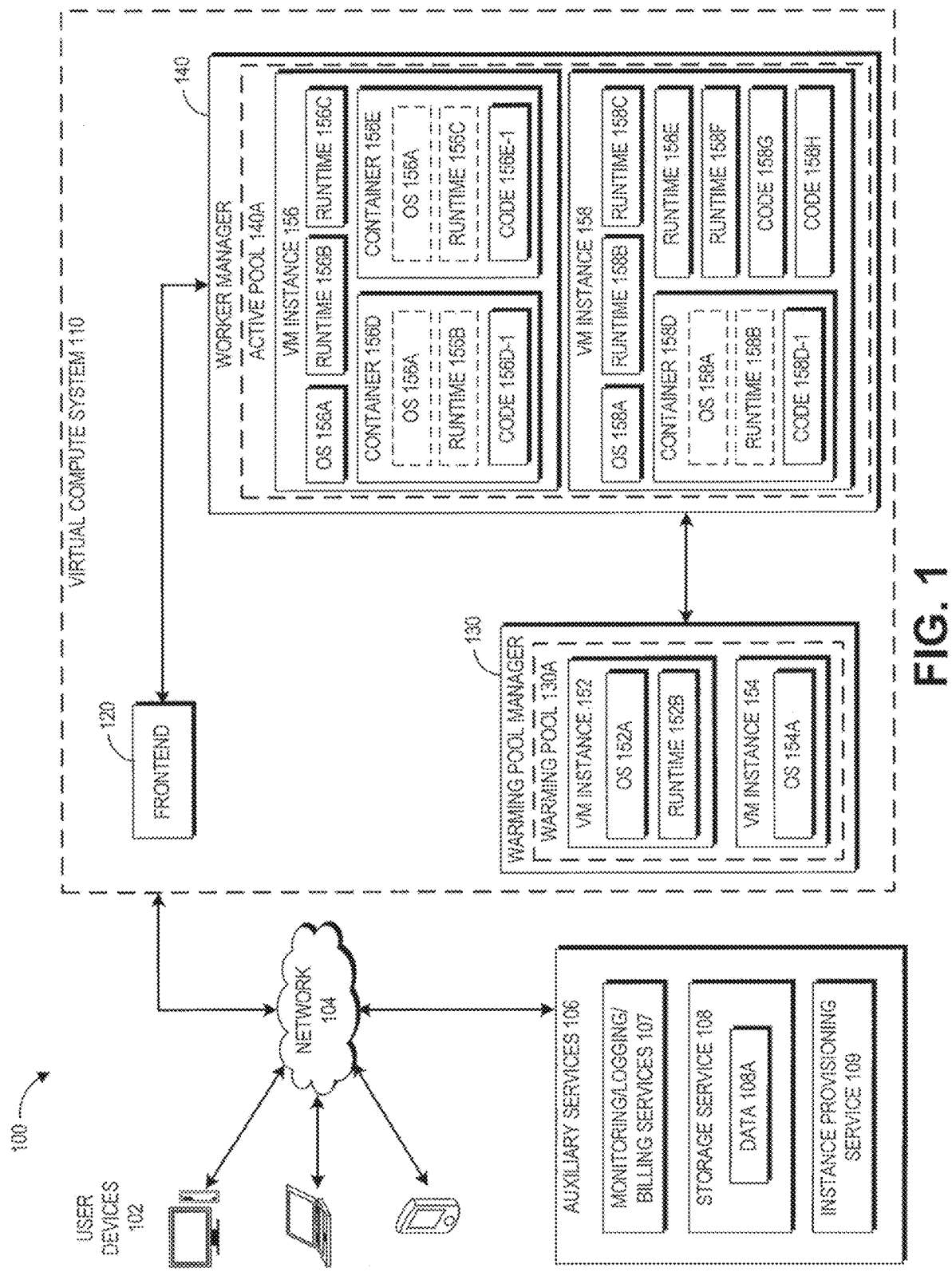
FIG. 1 is a block diagram depicting an illustrative environment for acquiring low latency compute capacity.

Companies and organizations no longer need to acquire and manage their own data centers in order to perform computing operations (e.g., execute code, including threads, programs, software, routines, subroutines, processes, etc.). With the advent of cloud computing, storage space and compute power traditionally provided by hardware computing devices can now be obtained and configured in minutes over the Internet. Thus, developers can quickly purchase a desired amount of computing resources without having to worry about acquiring physical machines. Such computing resources are typically purchased in the form of virtual computing resources, or virtual machine instances. These instances of virtual machines, which are hosted on physical computing devices with their own operating systems and other software components, can be utilized in the same manner as physical computers.

However, even when virtual computing resources are purchased, developers still have to decide how many and what type of virtual machine instances to purchase, and how long to keep them. For example, the costs of using the virtual machine instances may vary depending on the type and the number of hours they are rented. In addition, the minimum time a virtual machine may be rented is typically on the order of hours. Further, developers have to specify the hardware and software resources (e.g., type of operating systems and language runtimes, etc.) to install on the virtual machines. Other concerns that they might have include over-utilization (e.g., acquiring too little computing resources and suffering performance issues), under-utilization (e.g., acquiring more computing resources than necessary to run the codes, and thus overpaying), prediction of change in traffic (e.g., so that they know when to scale up or down), and instance and language runtime startup delay, which can take 3-10 minutes, or longer, even though users may desire computing capacity on the order of seconds or even milliseconds. Thus, an improved method of allowing users to take advantage of the virtual machine instances provided by service providers is desired.

According to aspects of the present disclosure, by maintaining a pool of pre-initialized virtual machine instances that are ready for use as soon as a user request is received, delay (sometimes referred to as latency) associated with executing the user code (e.g., instance and language runtime startup time) can be significantly reduced.

Generally described, aspects of the present disclosure relate to the management of virtual machine instances and containers created therein. Specifically, systems and methods are disclosed which facilitate management of virtual machine instances in a virtual compute system. The virtual compute system maintains a pool of virtual machine instances that have one or more software components (e.g., operating systems, language runtimes, libraries, etc.) loaded thereon. The virtual machine instances in the pool can be designated to service user requests to execute program codes. The program codes can be executed in isolated containers that are created on the virtual machine instances. Since the virtual machine instances in the pool have already been booted and loaded with particular operating systems and language runtimes by the time the requests are received, the delay associated with finding compute capacity that can handle the requests (e.g., by executing the user code in one or more containers created on the virtual machine instances) is significantly reduced.

In another aspect, a virtual compute system may maintain a pool of virtual machine instances on one or more physical computing devices, where each virtual machine instance has one or more software components loaded thereon. When the virtual compute system receives a request to execute the program code of a user, which specifies one or more computing constraints for executing the program code of the user, the virtual compute system may select a virtual machine instance for executing the program code of the user based on the one or more computing constraints specified by the request and cause the program code of the user to be executed on the selected virtual machine instance.

Specific embodiments and example applications of the present disclosure will now be described with reference to the drawings. These embodiments and example applications are intended to illustrate, and not limit, the present disclosure.

With reference to FIG. 1, a block diagram illustrating an embodiment of a virtual environment 100 will be described. The example shown in FIG. 1 includes a virtual environment 100 in which users (e.g., developers, etc.) of user computing devices 102 may run various program codes using the virtual computing resources provided by a virtual compute system 110.

By way of illustration, various example user computing devices 102 are shown in communication with the virtual compute system 110, including a desktop computer, laptop, and a mobile phone. In general, the user computing devices 102 can be any computing device such as a desktop, laptop, mobile phone (or smartphone), tablet, kiosk, wireless device, and other electronic devices. In addition, the user computing devices 102 may include web services running on the same or different data centers, where, for example, different web services may programmatically communicate with each other to perform one or more techniques described herein. Further, the user computing devices 102 may include Internet of Things (IoT) devices such as Internet appliances and connected devices. The virtual compute system 110 may provide the user computing devices 102 with one or more user interfaces, command-line interfaces (CLI), application programing interfaces (API), and/or other programmatic interfaces for generating and uploading user codes, invoking the user codes (e.g., submitting a request to execute the user codes on the virtual compute system 110), scheduling event-based jobs or timed jobs, tracking the user codes, and/or viewing other logging or monitoring information related to their requests and/or user codes. Although one or more embodiments may be described herein as using a user interface, it should be appreciated that such embodiments may, additionally or alternatively, use any CLIs, APIs, or other programmatic interfaces.

The user computing devices 102 access the virtual compute system 110 over a network 104. The network 104 may be any wired network, wireless network, or combination thereof. In addition, the network 104 may be a personal area network, local area network, wide area network, over-the-air broadcast network (e.g., for radio or television), cable network, satellite network, cellular telephone network, or combination thereof. For example, the network 104 may be a publicly accessible network of linked networks, possibly operated by various distinct parties, such as the Internet. In some embodiments, the network 104 may be a private or semi-private network, such as a corporate or university intranet. The network 104 may include one or more wireless networks, such as a Global System for Mobile Communications (GSM) network, a Code Division Multiple Access (CDMA) network, a Long Term Evolution (LTE) network, or any other type of wireless network. The network 104 can use protocols and components for communicating via the Internet or any of the other aforementioned types of networks. For example, the protocols used by the network 104 may include Hypertext Transfer Protocol (HTTP), HTTP Secure (HTTPS), Message Queue Telemetry Transport (MQTT), Constrained Application Protocol (CoAP), and the like. Protocols and components for communicating via the Internet or any of the other aforementioned types of communication networks are well known to those skilled in the art and, thus, are not described in more detail herein.

The virtual compute system 110 is depicted in FIG. 1 as operating in a distributed computing environment including several computer systems that are interconnected using one or more computer networks. The virtual compute system 110 could also operate within a computing environment having a fewer or greater number of devices than are illustrated in FIG. 1. Thus, the depiction of the virtual compute system 110 in FIG. 1 should be taken as illustrative and not limiting to the present disclosure. For example, the virtual compute system 110 or various constituents thereof could implement various Web services components, hosted or "cloud" computing environments, and/or peer-to-peer network configurations to implement at least a portion of the processes described herein.

Further, the virtual compute system 110 may be implemented in hardware and/or software and may, for instance, include one or more physical or virtual servers implemented on physical computer hardware configured to execute computer executable instructions for performing various features that will be described herein. The one or more servers may be geographically dispersed or geographically co-located, for instance, in one or more data centers.

In the environment illustrated FIG. 1, the virtual environment 100 includes a virtual compute system 110, which includes a frontend 120, a warming pool manager 130, and a worker manager 140. In the depicted example, virtual machine instances ("instances") 152, 154 are shown in a warming pool 130A managed by the warming pool manager 130, and instances 156, 158 are shown in an active pool 140A managed by the worker manager 140. The illustration of the various components within the virtual compute system 110 is logical in nature and one or more of the components can be implemented by a single computing device or multiple computing devices. For example, the instances 152, 154, 156, 158 can be implemented on one or more physical computing devices in different various geographic regions. Similarly, each of the frontend 120, the warming pool manager 130, and the worker manager 140 can be implemented across multiple physical computing devices. Alternatively, one or more of the frontend 120, the warming pool manager 130, and the worker manager 140 can be implemented on a single physical computing device. In some embodiments, the virtual compute system 110 may comprise multiple frontends, multiple warming pool managers, and/or multiple worker managers. Although four virtual machine instances are shown in the example of FIG. 1, the embodiments described herein are not limited as such, and one skilled in the art will appreciate that the virtual compute system 110 may comprise any number of virtual machine instances implemented using any number of physical computing devices. Similarly, although a single warming pool and a single active pool are shown in the example of FIG. 1, the embodiments described herein are not limited as such, and one skilled in the art will appreciate that the virtual compute system 110 may comprise any number of warming pools and active pools.

In the example of FIG. 1, the virtual compute system 110 is illustrated as connected to the network 104. In some embodiments, any of the components within the virtual compute system 110 can communicate with other components (e.g., the user computing devices 102 and auxiliary services 106, which may include monitoring/logging/billing services 107, storage service 108, an instance provisioning service 109, and/or other services that may communicate with the virtual compute system 110) of the virtual environment 100 via the network 104. In other embodiments, not all components of the virtual compute system 110 are capable of communicating with other components of the virtual environment 100. In one example, only the frontend 120 may be connected to the network 104, and other components of the virtual compute system 110 may communicate with other components of the virtual environment 100 via the frontend 120.

Users may use the virtual compute system 110 to execute user code thereon. For example, a user may wish to run a piece of code in connection with a web or mobile application that the user has developed. One way of running the code would be to acquire virtual machine instances from service providers who provide infrastructure as a service, configure the virtual machine instances to suit the user's needs, and use the configured virtual machine instances to run the code. Alternatively, the user may send a code execution request to the virtual compute system 110. The virtual compute system 110 can handle the acquisition and configuration of compute capacity (e.g., containers, instances, etc., which are described in greater detail below) based on the code execution request, and execute the code using the compute capacity. The virtual compute system 110 may automatically scale up and down based on the volume, thereby relieving the user from the burden of having to worry about over-utilization (e.g., acquiring too little computing resources and suffering performance issues) or under-utilization (e.g., acquiring more computing resources than necessary to run the codes, and thus overpaying).

The frontend 120 processes all the requests to execute user code on the virtual compute system 110. In one embodiment, the frontend 120 serves as a front door to all the other services provided by the virtual compute system 110. The frontend 120 processes the requests and makes sure that the requests are properly authorized. For example, the frontend 120 may determine whether the user associated with the request is authorized to access the user code specified in the request.

The user code as used herein may refer to any program code (e.g., a program, routine, subroutine, thread, etc.) written in a specific program language. In the present disclosure, the terms "code," "user code," and "program code," may be used interchangeably. Such user code may be executed to achieve a specific task, for example, in connection with a particular web application or mobile application developed by the user. For example, the user codes may be written in JavaScript (node.js), Java, Python, and/or Ruby. The request may include the user code (or the location thereof) and one or more arguments to be used for executing the user code. For example, the user may provide the user code along with the request to execute the user code. In another example, the request may identify a previously uploaded program code (e.g., using the API for uploading the code) by its name or its unique ID. In yet another example, the code may be included in the request as well as uploaded in a separate location (e.g., the storage service 108 or a storage system internal to the virtual compute system 110) prior to the request is received by the virtual compute system 110. The virtual compute system 110 may vary its code execution strategy based on where the code is available at the time the request is processed. [0028] The frontend 120 may receive the request to execute such user codes in response to Hypertext Transfer Protocol Secure (HTTPS) requests from a user. Also, any information (e.g., headers and parameters) included in the HTTPS request may also be processed and utilized when executing the user code. As discussed above, any other protocols, including, for example, HTTP, MQTT, and CoAP, may be used to transfer the message containing the code execution request to the frontend 120. The frontend 120 may also receive the request to execute such user codes when an event is detected, such as an event that the user has registered to trigger automatic request generation. For example, the user may have registered the user code with an auxiliary service 106 and specified that whenever a particular event occurs (e.g., a new file is uploaded), the request to execute the user code is sent to the frontend 120. Alternatively, the user may have registered a timed job (e.g., execute the user code every 24 hours). In such an example, when the scheduled time arrives for the timed job, the request to execute the user code may be sent to the frontend 120. In yet another example, the frontend 120 may have a queue of incoming code execution requests, and when the user's batch job is removed from the virtual compute system's work queue, the frontend 120 may process the user request. In yet another example, the request may originate from another component within the virtual compute system 110 or other servers or services not illustrated in FIG. 1.

A user request may specify one or more third-party libraries (including native libraries) to be used along with the user code. In one embodiment, the user request is a ZIP file containing the user code and any libraries (and/or identifications of storage locations thereof). In some embodiments, the user request includes metadata that indicates the program code to be executed, the language in which the program code is written, the user associated with the request, and/or the computing resources (e.g., memory, etc.) to be reserved for executing the program code. For example, the program code may be provided with the request, previously uploaded by the user, provided by the virtual compute system 110 (e.g., standard routines), and/or provided by third parties. In some embodiments, such resource-level constraints (e.g., how much memory is to be allocated for executing a particular user code) are specified for the particular user code, and may not vary over each execution of the user code. In such cases, the virtual compute system 110 may have access to such resource-level constraints before each individual request is received, and the individual requests may not specify such resource-level constraints. In some embodiments, the user request may specify other constraints such as permission data that indicates what kind of permissions that the request has to execute the user code. Such permission data may be used by the virtual compute system 110 to access private resources (e.g., on a private network).

In some embodiments, the user request may specify the behavior that should be adopted for handling the user request. In such embodiments, the user request may include an indicator for enabling one or more execution modes in which the user code associated with the user request is to be executed. For example, the request may include a flag or a header for indicating whether the user code should be executed in a debug mode in which the debugging and/or logging output that may be generated in connection with the execution of the user code is provided back to the user (e.g., via a console user interface). In such an example, the virtual compute system 110 may inspect the request and look for the flag or the header, and if it is present, the virtual compute system 110 may modify the behavior (e.g., logging facilities) of the container in which the user code is executed, and cause the output data to be provided back to the user. In some embodiments, the behavior/mode indicators are added to the request by the user interface provided to the user by the virtual compute system 110. Other features such as source code profiling, remote debugging, etc. may also be enabled or disabled based on the indication provided in the request.

In some embodiments, the virtual compute system 110 may include multiple frontends 120. In such embodiments, a load balancer may be provided to distribute the incoming requests to the multiple frontends 120, for example, in a round-robin fashion. In some embodiments, the manner in which the load balancer distributes incoming requests to the multiple frontends 120 may be based on the state of the warming pool 130A and/or the active pool 140A. For example, if the capacity in the warming pool 130A is deemed to be sufficient, the requests may be distributed to the multiple frontends 120 based on the individual capacities of the frontends 120 (e.g., based on one or more load balancing restrictions). On the other hand, if the capacity in the warming pool 130A is less than a threshold amount, one or more of such load balancing restrictions may be removed such that the requests may be distributed to the multiple frontends 120 in a manner that reduces or minimizes the number of virtual machine instances taken from the warming pool 130A. For example, even if, according to a load balancing restriction, a request is to be routed to Frontend A, if Frontend A needs to take an instance out of the warming pool 130A to service the request but Frontend B can use one of the instances in its active pool to service the same request, the request may be routed to Frontend B.

The warming pool manager 130 ensures that virtual machine instances are ready to be used by the worker manager 140 when the virtual compute system 110 receives a request to execute user code on the virtual compute system 110. In the example illustrated in FIG. 1, the warming pool manager 130 manages the warming pool 130A, which is a group (sometimes referred to as a pool) of pre-initialized and pre-configured virtual machine instances that may be used to service incoming user code execution requests. In some embodiments, the warming pool manager 130 causes virtual machine instances to be booted up on one or more physical computing machines within the virtual compute system 110 and added to the warming pool 130A. In other embodiments, the warming pool manager 130 communicates with an auxiliary virtual machine instance service (e.g., the instance provisioning service 109 of FIG. 1) to create and add new instances to the warming pool 130A. For example, the warming pool manager 130 may cause additional instances to be added to the warming pool 130A based on the available capacity in the warming pool 130A to service incoming requests. In some embodiments, the warming pool manager 130 may utilize both physical computing devices within the virtual compute system 110 and one or more virtual machine instance services to acquire and maintain compute capacity that can be used to service code execution requests received by the frontend 120. In some embodiments, the virtual compute system 110 may comprise one or more logical knobs or switches for controlling (e.g., increasing or decreasing) the available capacity in the warming pool 130A. For example, a system administrator may use such a knob or switch to increase the capacity available (e.g., the number of pre-booted instances) in the warming pool 130A during peak hours. In some embodiments, virtual machine instances in the warming pool 130A can be configured based on a predetermined set of configurations independent from a specific user request to execute a user's code. The predetermined set of configurations can correspond to various types of virtual machine instances to execute user codes. The warming pool manager 130 can optimize types and numbers of virtual machine instances in the warming pool 130A based on one or more metrics related to current or previous user code executions.

As shown in FIG. 1, instances may have operating systems (OS) and/or language runtimes loaded thereon. For example, the warming pool 130A managed by the warming pool manager 130 comprises instances 152, 154. The instance 152 includes an OS 152A and a runtime 152B. The instance 154 includes an OS 154A. In some embodiments, the instances in the warming pool 130A may also include containers (which may further contain copies of operating systems, runtimes, user codes, etc.), which are described in greater detail below. Although the instance 152 is shown in FIG. 1 to include a single runtime, in other embodiments, the instances depicted in FIG. 1 may include two or more runtimes, each of which may be used for running a different user code. In some embodiments, the warming pool manager 130 may maintain a list of instances in the warming pool 130A. The list of instances may further specify the configuration (e.g., OS, runtime, container, etc.) of the instances.

In some embodiments, the virtual machine instances in the warming pool 130A may be used to serve any user's request. In one embodiment, all the virtual machine instances in the warming pool 130A are configured in the same or substantially similar manner. In another embodiment, the virtual machine instances in the warming pool 130A may be configured differently to suit the needs of different users. For example, the virtual machine instances may have different operating systems, different language runtimes, and/or different libraries loaded thereon. In yet another embodiment, the virtual machine instances in the warming pool 130A may be configured in the same or substantially similar manner (e.g., with the same OS, language runtimes, and/or libraries), but some of those instances may have different container configurations. For example, two instances may have runtimes for both Python and Ruby, but one instance may have a container configured to run Python code, and the other instance may have a container configured to run Ruby code. In some embodiments, multiple warming pools 130A, each having identically-configured virtual machine instances, are provided.

The warming pool manager 130 may pre-configure the virtual machine instances in the warming pool 130A, such that each virtual machine instance is configured to satisfy at least one of the operating conditions that may be requested or specified by the user request to execute program code on the virtual compute system 110. In one embodiment, the operating conditions may include program languages in which the potential user codes may be written. For example, such languages may include Java, JavaScript, Python, Ruby, and the like. In some embodiments, the set of languages that the user codes may be written in may be limited to a predetermined set (e.g., set of 4 languages, although in some embodiments sets of more or less than four languages are provided) in order to facilitate pre-initialization of the virtual machine instances that can satisfy requests to execute user codes. For example, when the user is configuring a request via a user interface provided by the virtual compute system 110, the user interface may prompt the user to specify one of the predetermined operating conditions for executing the user code. In another example, the service-level agreement (SLA) for utilizing the services provided by the virtual compute system 110 may specify a set of conditions (e.g., programming languages, computing resources, etc.) that user requests should satisfy, and the virtual compute system 110 may assume that the requests satisfy the set of conditions in handling the requests. In another example, operating conditions specified in the request may include: the amount of compute power to be used for processing the request; the type of the request (e.g., HTTP vs. a triggered event); the timeout for the request (e.g., threshold time after which the request may be terminated); security policies (e.g., may control which instances in the warming pool 130A are usable by which user); and etc.

The worker manager 140 manages the instances used for servicing incoming code execution requests. In the example illustrated in FIG. 1, the worker manager 140 manages the active pool 140A, which is a group (sometimes referred to as a pool) of virtual machine instances that are currently assigned to one or more users. Although the virtual machine instances are described here as being assigned to a particular user, in some embodiments, the instances may be assigned to a group of users, such that the instance is tied to the group of users and any member of the group can utilize resources on the instance. For example, the users in the same group may belong to the same security group (e.g., based on their security credentials) such that executing one member's code in a container on a particular instance after another member's code has been executed in another container on the same instance does not pose security risks. Similarly, the worker manager 140 may assign the instances and the containers according to one or more policies that dictate which requests can be executed in which containers and which instances can be assigned to which users. An example policy may specify that instances are assigned to collections of users who share the same account (e.g., account for accessing the services provided by the virtual compute system 110). In some embodiments, the requests associated with the same user group may share the same containers (e.g., if the user codes associated therewith are identical). In some embodiments, a request does not differentiate between the different users of the group and simply indicates the group to which the users associated with the requests belong.

As shown in FIG. 1, instances may have operating systems (OS), language runtimes, and containers. The containers may have individual copies of the OS and the runtimes and user codes loaded thereon. In the example of FIG. 1, the active pool 140A managed by the worker manager 140 includes the instances 156, 158. The instance 156 has an OS 156A, runtimes 156B, 156C, and containers 156D, 156E. The container 156D includes a copy of the OS 156A, a copy of the runtime 156B, and a copy of a code 156D-1. The container 156E includes a copy of the OS 156A, a copy of the runtime 156C, and a copy of a code 156E-1. The instance 158 has an OS 158A, runtimes 158B, 158C, 158E, 158F, a container 158D, and codes 158G, 158H. The container 158D has a copy of the OS 158A, a copy of the runtime 158B, and a copy of a code 158D-1. As illustrated in FIG. 1, instances may have user codes loaded thereon, and containers within those instances may also have user codes loaded therein. In some embodiments, the worker manager 140 may maintain a list of instances in the active pool 140A. The list of instances may further specify the configuration (e.g., OS, runtime, container, etc.) of the instances. In some embodiments, the worker manager 140 may have access to a list of instances in the warming pool 130A (e.g., including the number and type of instances). In other embodiments, the worker manager 140 requests compute capacity from the warming pool manager 130 without having knowledge of the virtual machine instances in the warming pool 130A.

In the example illustrated in FIG. 1, user codes are executed in isolated virtual compute systems referred to as containers (e.g., containers 156D, 156E, 158D). Containers are logical units created within a virtual machine instance using the resources available on that instance. For example, the worker manager 140 may, based on information specified in the request to execute user code, create a new container or locate an existing container in one of the instances in the active pool 140A and assigns the container to the request to handle the execution of the user code associated with the request. In one embodiment, such containers are implemented as Linux containers. The virtual machine instances in the active pool 140A may have one or more containers created thereon and have one or more program codes associated with the user loaded thereon (e.g., either in one of the containers or in a local cache of the instance). Each container may have credential information made available therein, so that user codes executing on the container have access to whatever the corresponding credential information allows them to access.

Once a request has been successfully processed by the frontend 120, the worker manager 140 finds capacity to service the request to execute user code on the virtual compute system 110. For example, if there exists a particular virtual machine instance in the active pool 140A that has a container with the same user code loaded therein (e.g., code 156D-1 shown in the container 156D), the worker manager 140 may assign the container to the request and cause the user code to be executed in the container. Alternatively, if the user code is available in the local cache of one of the virtual machine instances (e.g., codes 158G, 158H, which are stored on the instance 158 but do not belong to any individual containers), the worker manager 140 may create a new container on such an instance, assign the container to the request, and cause the user code to be loaded and executed in the container.

If the worker manager 140 determines that the user code associated with the request is not found on any of the instances (e.g., either in a container or the local cache of an instance) in the active pool 140A, the worker manager 140 may determine whether any of the instances in the active pool 140A is currently assigned to the user associated with the request and has compute capacity to handle the current request. If there is such an instance, the worker manager 140 may create a new container on the instance and assign the container to the request. Alternatively, the worker manager 140 may further configure an existing container on the instance assigned to the user, and assign the container to the request. For example, the worker manager 140 may determine that the existing container may be used to execute the user code if a particular library demanded by the current user request is loaded thereon. In such a case, the worker manager 140 may load the particular library and the user code onto the container and use the container to execute the user code.

If the active pool 140A does not contain any instances currently assigned to the user, the worker manager 140 pulls a new virtual machine instance from the warming pool 130A, assigns the instance to the user associated with the request, creates a new container on the instance, assigns the container to the request, and causes the user code to be downloaded and executed on the container.

In some embodiments, the virtual compute system 110 is adapted to begin execution of the user code shortly after it is received (e.g., by the frontend 120). A time period can be determined as the difference in time between initiating execution of the user code (e.g., in a container on a virtual machine instance associated with the user) and receiving a request to execute the user code (e.g., received by a frontend). The virtual compute system 110 is adapted to begin execution of the user code within a time period that is less than a predetermined duration. In one embodiment, the predetermined duration is 500 ms. In another embodiment, the predetermined duration is 300 ms. In another embodiment, the predetermined duration is 100 ms. In another embodiment, the predetermined duration is 50 ms. In another embodiment, the predetermined duration is 10 ms. In another embodiment, the predetermined duration may be any value chosen from the range of 10 ms to 500 ms. In some embodiments, the virtual compute system 110 is adapted to begin execution of the user code within a time period that is less than a predetermined duration if one or more conditions are satisfied. For example, the one or more conditions may include any one of: (1) the user code is loaded on a container in the active pool 140A at the time the request is received; (2) the user code is stored in the code cache of an instance in the active pool 140A at the time the request is received; (3) the active pool 140A contains an instance assigned to the user associated with the request at the time the request is received; or (4) the warming pool 130A has capacity to handle the request at the time the request is received.

The user code may be downloaded from an auxiliary service 106 such as the storage service 108 of FIG. 1. Data 108A illustrated in FIG. 1 may comprise user codes uploaded by one or more users, metadata associated with such user codes, or any other data utilized by the virtual compute system 110 to perform one or more techniques described herein. Although only the storage service 108 is illustrated in the example of FIG. 1, the virtual environment 100 may include other levels of storage systems from which the user code may be downloaded. For example, each instance may have one or more storage systems either physically (e.g., a local storage resident on the physical computing system on which the instance is running) or logically (e.g., a network-attached storage system in network communication with the instance and provided within or outside of the virtual compute system 110) associated with the instance on which the container is created. Alternatively, the code may be downloaded from a web-based data store provided by the storage service 108.

Once the worker manager 140 locates one of the virtual machine instances in the warming pool 130A that can be used to serve the user code execution request, the warming pool manager 130 or the worker manger 140 takes the instance out of the warming pool 130A and assigns it to the user associated with the request. The assigned virtual machine instance is taken out of the warming pool 130A and placed in the active pool 140A. In some embodiments, once the virtual machine instance has been assigned to a particular user, the same virtual machine instance cannot be used to service requests of any other user. This provides security benefits to users by preventing possible co-mingling of user resources. Alternatively, in some embodiments, multiple containers belonging to different users (or assigned to requests associated with different users) may co-exist on a single virtual machine instance. Such an approach may improve utilization of the available compute capacity.

In some embodiments, the virtual compute system 110 may maintain a separate cache in which user codes are stored to serve as an intermediate level of caching system between the local cache of the virtual machine instances and a web-based network storage (e.g., accessible via the network 104). The various scenarios that the worker manager 140 may encounter in servicing the request are described in greater detail below with reference to FIG. 4.

After the user code has been executed, the worker manager 140 may tear down the container used to execute the user code to free up the resources it occupied to be used for other containers in the instance. Alternatively, the worker manager 140 may keep the container running to use it to service additional requests from the same user. For example, if another request associated with the same user code that has already been loaded in the container, the request can be assigned to the same container, thereby eliminating the delay associated with creating a new container and loading the user code in the container. In some embodiments, the worker manager 140 may tear down the instance in which the container used to execute the user code was created. Alternatively, the worker manager 140 may keep the instance running to use it to service additional requests from the same user. The determination of whether to keep the container and/or the instance running after the user code is done executing may be based on a threshold time, the type of the user, average request volume of the user, and/or other operating conditions. For example, after a threshold time has passed (e.g., 5 minutes, 30 minutes, 1 hour, 24 hours, 30 days, etc.) without any activity (e.g., running of the code), the container and/or the virtual machine instance is shutdown (e.g., deleted, terminated, etc.), and resources allocated thereto are released. In some embodiments, the threshold time passed before a container is torn down is shorter than the threshold time passed before an instance is torn down.

In some embodiments, the virtual compute system 110 may provide data to one or more of the auxiliary services 106 as it services incoming code execution requests. For example, the virtual compute system 110 may communicate with the monitoring/logging/billing services 107. The monitoring/logging/billing services 107 may include: a monitoring service for managing monitoring information received from the virtual compute system 110, such as statuses of containers and instances on the virtual compute system 110; a logging service for managing logging information received from the virtual compute system 110, such as activities performed by containers and instances on the virtual compute system 110; and a billing service for generating billing information associated with executing user code on the virtual compute system 110 (e.g., based on the monitoring information and/or the logging information managed by the monitoring service and the logging service). In addition to the system-level activities that may be performed by the monitoring/logging/billing services 107 (e.g., on behalf of the virtual compute system 110) as described above, the monitoring/logging/billing services 107 may provide application-level services on behalf of the user code executed on the virtual compute system 110. For example, the monitoring/logging/billing services 107 may monitor and/or log various inputs, outputs, or other data and parameters on behalf of the user code being executed on the virtual compute system 110. Although shown as a single block, the monitoring, logging, and billing services 107 may be provided as separate services.

In some embodiments, the worker manager 140 may perform health checks on the instances and containers managed by the worker manager 140 (e.g., those in the active pool 140A). For example, the health checks performed by the worker manager 140 may include determining whether the instances and the containers managed by the worker manager 140 have any issues of (1) misconfigured networking and/or startup configuration, (2) exhausted memory, (3) corrupted file system, (4) incompatible kernel, and/or any other problems that may impair the performance of the instances and the containers. In one embodiment, the worker manager 140 performs the health checks periodically (e.g., every 5 minutes, every 30 minutes, every hour, every 24 hours, etc.). In some embodiments, the frequency of the health checks may be adjusted automatically based on the result of the health checks. In other embodiments, the frequency of the health checks may be adjusted based on user requests. In some embodiments, the worker manager 140 may perform similar health checks on the instances and/or containers in the warming pool 130A. The instances and/or the containers in the warming pool 130A may be managed either together with those instances and containers in the active pool 140A or separately. In some embodiments, in the case where the health of the instances and/or the containers in the warming pool 130A is managed separately from the active pool 140A, the warming pool manager 130, instead of the worker manager 140, may perform the health checks described above on the instances and/or the containers in the warming pool 130A.

The worker manager 140 may include an instance allocation unit for finding compute capacity (e.g., containers) to service incoming code execution requests and a user code execution unit for facilitating the execution of user codes on those containers. An example configuration of the worker manager 140 is described in greater detail below with reference to FIG. 2.

Figure 2:
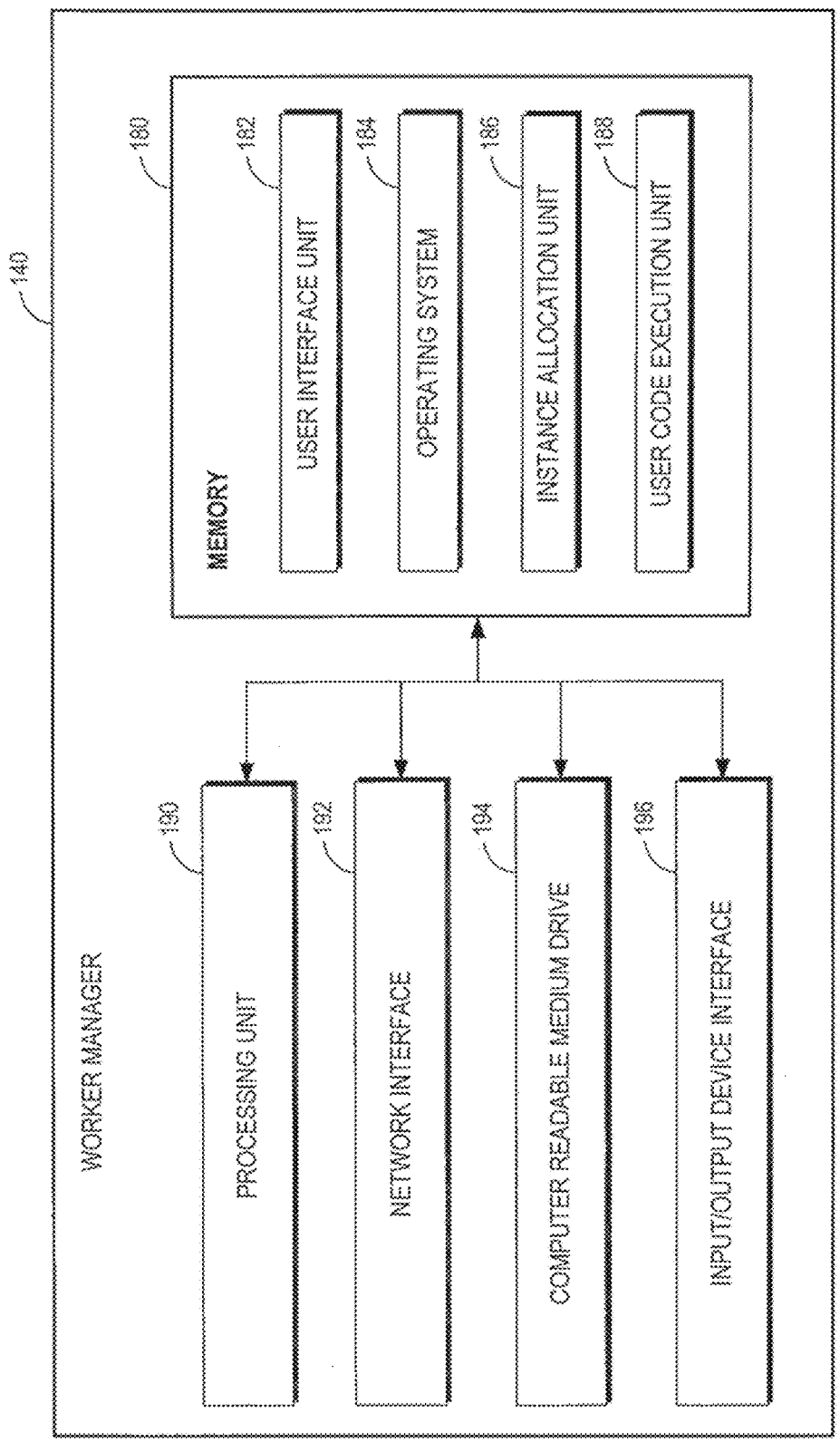
FIG. 2 depicts a general architecture of a computing device providing a virtual compute system manager for acquiring low latency compute capacity.

FIG. 2 depicts a general architecture of a computing system (referenced as worker manager 140) that manages the virtual machine instances in the virtual compute system 110. The general architecture of the worker manager 140 depicted in FIG. 2 includes an arrangement of computer hardware and software modules that may be used to implement aspects of the present disclosure. The hardware modules may be implemented with physical electronic devices, as discussed in greater detail below. The worker manager 140 may include many more (or fewer) elements than those shown in FIG. 2. It is not necessary, however, that all of these generally conventional elements be shown in order to provide an enabling disclosure. Additionally, the general architecture illustrated in FIG. 2 may be used to implement one or more of the other components illustrated in FIG. 1. As illustrated, the worker manager 140 includes a processing unit 190, a network interface 192, a computer readable medium drive 194, an input/output device interface 196, all of which may communicate with one another by way of a communication bus. The network interface 192 may provide connectivity to one or more networks or computing systems. The processing unit 190 may thus receive information and instructions from other computing systems or services via the network 104. The processing unit 190 may also communicate to and from memory 180 and further provide output information for an optional display (not shown) via the input/output device interface 196. The input/output device interface 196 may also accept input from an optional input device (not shown).

The memory 180 may contain computer program instructions (grouped as modules in some embodiments) that the processing unit 190 executes in order to implement one or more aspects of the present disclosure. The memory 180 generally includes RAM, ROM and/or other persistent, auxiliary or non-transitory computer-readable media. The memory 180 may store an operating system 184 that provides computer program instructions for use by the processing unit 190 in the general administration and operation of the worker manager 140. The memory 180 may further include computer program instructions and other information for implementing aspects of the present disclosure. For example, in one embodiment, the memory 180 includes a user interface unit 182 that generates user interfaces (and/or instructions therefor) for display upon a computing device, e.g., via a navigation and/or browsing interface such as a browser or application installed on the computing device. In addition, the memory 180 may include and/or communicate with one or more data repositories (not shown), for example, to access user program codes and/or libraries.

In addition to and/or in combination with the user interface unit 182, the memory 180 may include an instance allocation unit 186 and a user code execution unit 188 that may be executed by the processing unit 190. In one embodiment, the user interface unit 182, instance allocation unit 186, and user code execution unit 188 individually or collectively implement various aspects of the present disclosure, e.g., finding compute capacity (e.g., a container) to be used for executing user code, causing the user code to be loaded and executed on the container, etc. as described further below.

The instance allocation unit 186 finds the compute capacity to be used for servicing a request to execute user code. For example, the instance allocation unit 186 identifies a virtual machine instance and/or a container that satisfies any constraints specified by the request and assigns the identified virtual machine instance and/or container to the user or the request itself. The instance allocation unit 186 may perform such identification based on the programming language in which the user code is written. For example, if the user code is written in Python, and the instance allocation unit 186 may find an virtual machine instance (e.g., in the warming pool 130A of FIG. 1) having the Python runtime pre-loaded thereon and assign the virtual machine instance to the user. In another example, if the program code specified in the request of the user is already loaded on an existing container or on another virtual machine instance assigned to the user (e.g., in the active pool 140A of FIG. 1), the instance allocation unit 186 may cause the request to be processed in the container or in a new container on the virtual machine instance. In some embodiments, if the virtual machine instance has multiple language runtimes loaded thereon, the instance allocation unit 186 may create a new container on the virtual machine instance and load the appropriate language runtime on the container based on the computing constraints specified in the request.

The user code execution unit 188 manages the execution of the program code specified by the request of the user once a particular virtual machine instance has been assigned to the user associated with the request and a container on the particular virtual machine instance has been assigned to the request. If the code is pre-loaded in a container on the virtual machine instance assigned to the user, the code is simply executed in the container. If the code is available via a network storage (e.g., storage service 108 of FIG. 1), the user code execution unit 188 downloads the code into a container on the virtual machine instance and causes the code to be executed (e.g., by communicating with the frontend 120 of FIG. 1) once it has been downloaded.

While the instance allocation unit 186 and the user code execution unit 188 are shown in FIG. 2 as part of the worker manager 140, in other embodiments, all or a portion of the instance allocation unit 186 and the user code execution unit 188 may be implemented by other components of the virtual compute system 110 and/or another computing device. For example, in certain embodiments of the present disclosure, another computing device in communication with the virtual compute system 110 may include several modules or components that operate similarly to the modules and components illustrated as part of the worker manager 140.

In some embodiments, the worker manager 140 may further include components other than those illustrated in FIG. 2. For example, the memory 180 may further include a container manager for managing creation, preparation, and configuration of containers within virtual machine instances.

Figure 3:
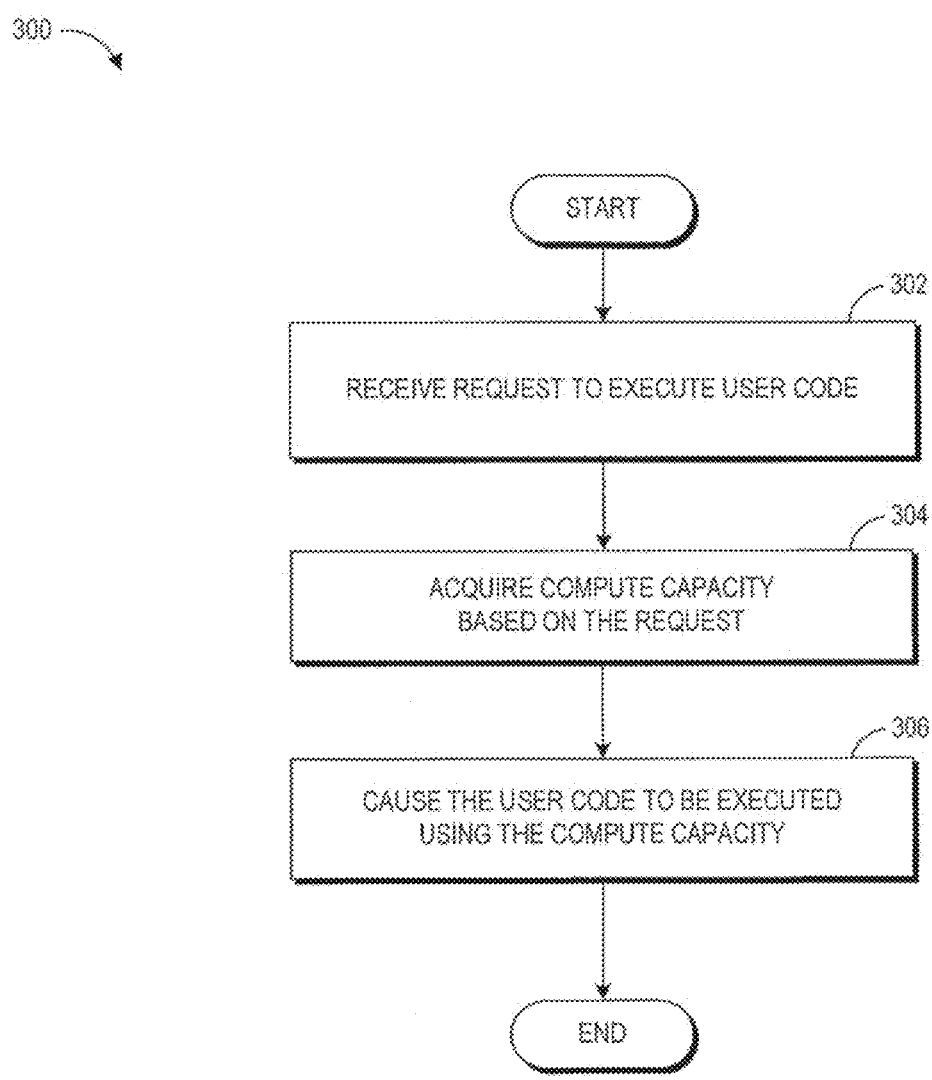
FIG. 3 is a flow diagram illustrating a low latency compute capacity acquisition routine implemented by a worker manager, according to an example aspect.

Turning now to FIG. 3, a routine 300 implemented by one or more components of the virtual compute system 110 (e.g., the worker manager 140) will be described. Although routine 300 is described with regard to implementation by the worker manager 140, one skilled in the relevant art will appreciate that alternative components may implement routine 300 or that one or more of the blocks may be implemented by a different component or in a distributed manner.

At block 302 of the illustrative routine 300, the worker manager 140 receives a request to execute user code. Alternatively, the worker manager 140 receives a request from the frontend 120 of FIG. 1 to find compute capacity for executing the user code associated with an incoming request received and processed by the frontend 120. For example, the frontend 120 may process the request received from the user computing devices 102 or the auxiliary services 106, and forward the request to the worker manager 140 after authenticating the user and determining that the user is authorized to access the specified user code. As discussed above, the request may include data or metadata that indicates the program code to be executed, the language in which the program code is written, the user associated with the request, and/or the computing resources (e.g., memory, etc.) to be reserved for executing the program code. For example, the request may specify that the user code is to be executed on "Operating System A" using "Language Runtime X." In such an example, the worker manager 140 may locate a virtual machine instance that has been pre-configured with "Operating System A" and "Language Runtime X" and assigned it to the user. The worker manager 140 may then create a container on the virtual machine instance for executing the user code therein.

Next, at block 304, the worker manager 140 acquires compute capacity based on the information indicated in the request. In some embodiments, the compute capacity comprises a container that is configured to service the code execution request. As discussed herein, the container may be acquired from the active pool 140A or the warming pool 130A. How the compute capacity is acquired is described in greater detail below with reference to FIG. 4.

At block 306, the worker manager 140 causes the user code to be executed using the compute capacity. For example, the worker manager 140 may send the address of the container assigned to the request to the frontend 120 so that the frontend 120 can proxy the code execution request to the address. In some embodiments, the address may be temporarily reserved by the worker manager 140 and the address and/or the container may automatically be released after a specified time period elapses. In some embodiments, the address and/or the container may automatically be released after the user code has finished executing in the container.

While the routine 300 of FIG. 3 has been described above with reference to blocks 302-306, the embodiments described herein are not limited as such, and one or more blocks may be omitted, modified, or switched without departing from the spirit of the present disclosure. For example, the block 302 may be modified such that the worker manager 140 receives a compute capacity acquisition request from the frontend 120.

Figure 4:
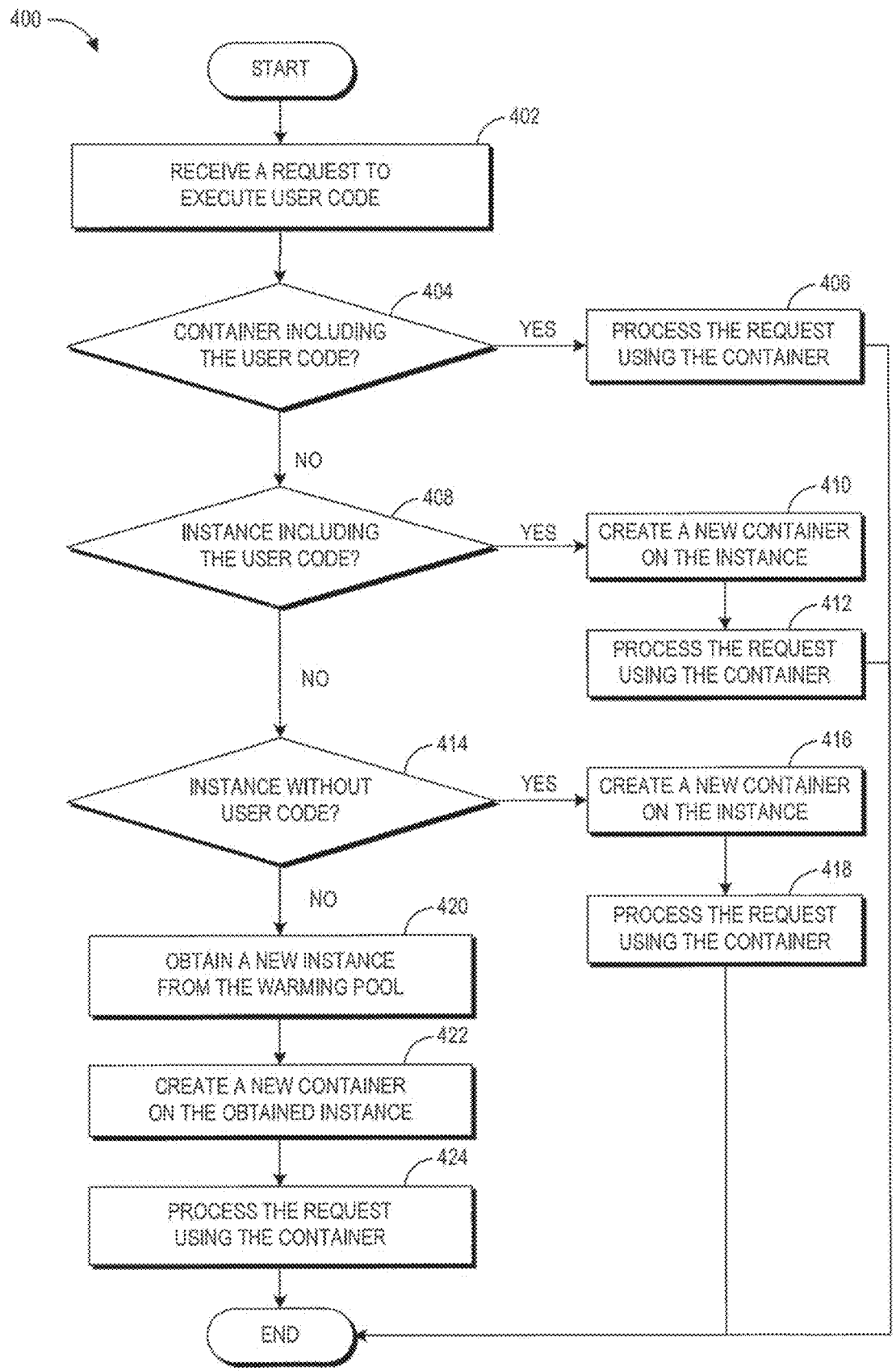
FIG. 4 is a flow diagram illustrating a low latency compute capacity acquisition routine implemented by a worker manager, according to another example aspect.

Turning now to FIG. 4, a routine 400 implemented by one or more components of the virtual compute system 110 (e.g., the worker manager 140) will be described. Although routine 400 is described with regard to implementation by the worker manager 140, one skilled in the relevant art will appreciate that alternative components may implement routine 400 or that one or more of the blocks may be implemented by a different component or in a distributed manner.

At block 402 of the illustrative routine 400, the worker manager 140 receives a request to execute user code. For example, the block 402 may be similar to the block 302 of FIG. 3.

Next, at block 404, the worker manager 140 determines whether there exists a container in the virtual compute system 110 that already has the user code associated with request loaded therein. In one embodiment, the worker manager 140 first determines whether the active pool 140A has any instances assigned to the user associated with the request, and look in any of those instances whether there is a container with the user code loaded therein. In another embodiment, the worker manager 140 checks a list that includes all the instances in the active pool 140A and searches the list for a code ID associated with or assigned to the user code. The code ID may be automatically generated based on the request or a portion thereof (e.g., based on the code location or the actual code). If the worker manager 140 determines that there is a container with the user code loaded therein, the routine 400 proceeds to block 406, where the worker manager 140 processes the request using the identified container. On the other hand, if the worker manager 140 determines that there is no container with the user coded loaded therein, the routine 400 proceeds to block 408.

The illustrative routine 400 describes temporal sharing of the containers, where the worker manager 140 may maintain a particular container after completing a previous request to execute a program code on that particular container and send a subsequent request associated with the same program code back to the same container. In another embodiment, the worker manager 140 may acquire and provide low latency compute capacity by utilizing spatial sharing. With spatial sharing, multiple temporally-overlapping requests are sent to the same container, e.g., forcing the container to use multiple threads to handle the multiple requests. For example, the worker manager 140 may find that a container is busy running a particular program code and further engage the same container to do more of the same work (e.g., execute the particular program code).

Retuning to FIG. 4, at block 408, the worker manager 140 determines whether there exists an instance in the virtual compute system 110 that has the user code stored thereon. For example, one of the instances may have previously executed the user code in a container created thereon, and the container may since have been terminated, but the user code may still remain on the instance (e.g., in an instance code cache). If the worker manager 140 determines that there is such an instance, the routine 400 proceeds to block 410, where the worker manager 140 creates a new container on the instance, and block 412, wherein the worker manager 140 causes the request to be processed using the container. Before the new container is created, the worker manager 140 may determine whether the instance has resources sufficient to handle the request. On the other hand, if the worker manager 140 determines that there is no such instance, the routine 400 proceeds to block 414.

At block 414, the worker manager 140 determines whether there exists an instance in the virtual compute system 110 that is currently assigned to the user associated with the request. In some embodiments, such a determination may have already been made (e.g., at block 404 and/or block 408). If the worker manager 140 determines that there is such an instance, the routine 400 proceeds to block 416, where the worker manager 140 creates a new container on the instance, and block 418, wherein the worker manager 140 causes the request to be processed using the container. Before the new container is created, the worker manager 140 may determine whether the instance has resources sufficient to handle the request. On the other hand, if the worker manager 140 determines that there is no such instance, the routine 400 proceeds to block 420.

At block 420, the worker manager 140 obtains a new instance from the warming pool 130A or from the warming pool manager 130. At block 422, the worker manager 140 creates a new container on the obtained instance. At block 424, the worker manager 140 processes the request using the container. For example, the worker manager 140 assigns the container to the request, and sends the address of the container to the frontend 120.

While the routine 400 of FIG. 4 has been described above with reference to blocks 402-410, the embodiments described herein are not limited as such, and one or more blocks may be omitted, modified, or switched without departing from the spirit of the present disclosure. For example, the block 402 may be modified such that the worker manager 140 receives a compute capacity acquisition request from the frontend 120. In another embodiment, the worker manager 140 may first determine whether there exists an instance assigned to the user, and if it determines that there is no such instance, the routine 400 may proceed directly to block 420. In another embodiment, instead of creating a new container at blocks 410 and 416, the worker manager 140 may configure an existing container on the instance assigned to the user and use the container to process the request.

Turning now to FIG. 5, a table 500 that illustrates various possible scenarios encountered by the worker manager 140 and how latency performance may be affected by instance and user code locations will be described. The table 500 shows the various locations that the user code associated with a request and the instance for servicing the request may be found after the request is received. In the example of FIG. 5, the user code may be found in a container (e.g., on a currently-running or recently used instance in the active pool 140A assigned to the user associated with the request), an instance (e.g., an instance in the active pool 140A, but not on a container within such instance), or an external service (e.g., code storage service such as the storage system 108), in the order of increasing latency (associated with executing the user code). Similarly, the instance for servicing the request may be found in an active pool (e.g., the active pool 140A), a warming pool (e.g., the warming pool 130A), or in neither, in which case a new instance would be created to handle the incoming request), in the order of increasing latency (associated with executing the user code). Depending on the implementation of the virtual compute system 110, one or more of the scenarios illustrated in FIG. 5 may not be feasible or possible. For example, in some implementations, if the user code is found in one of the containers, the instance for servicing the request is simply the instance in which the container is created, rendering the warming pool and the external service scenarios moot.

The locations referred to herein may be logical in nature, and may or may not correspond to physically distinct locations. Additionally, the locations illustrated in FIG. 5 are mere examples, and the embodiments described herein may involve fewer or more locations of user codes and/or instances.

Example Clauses

Clause 1: A system, comprising: one or more hardware computing devices configured to execute computer-executable instructions to at least: receive a request to execute a first program code, the request indicative of (i) one or more arguments to be used for the execution of the first program code and (ii) a first amount of computing resources to be allocated for the execution of the first program code; determine that a first virtual machine instance of a plurality of virtual machine instances includes the first program code and includes at least the first amount of computing resources; and cause the first program code to be executed, using the one or more arguments, in a container created on the first virtual machine instance and having at least the first amount of computing resources.

Clause 2: The system of Clause 1, wherein the request does not specify the first amount of computing resources, and the one or more hardware computing devices are further configured to determine the first amount of computing resources to be allocated for the execution of the first program code by accessing a resource constraint associated with the first program code.

Clause 3: The system of Clause 1, wherein the container on the first virtual machine instance includes the first program code at a time that the request is received.

Clause 4: The system of Clause 1, wherein the first virtual machine instance includes the first program code at a time that the request is received.

Clause 5: The system of Clause 1, further comprising a code cache configured to store program codes, wherein the one or more hardware computing devices are configured to store the first program code in the code cache.

Clause 6: The system of Clause 1, wherein the one or more hardware computing devices are further configured to determine, based on a request volume associated with the first program code, that the container is to be kept alive even after the execution of the first program code has been completed.

Clause 7: The system of Clause 1, wherein the one or more hardware computing devices are further configured to search for an identifier (ID) value associated with the first program code in a plurality of virtual machine instances.

Clause 8: A computer-implemented method, as implemented by one or more computing devices configured with specific executable instructions, comprising: receiving a request to execute a first program code, the request indicative of (i) one or more arguments to be used for the execution of the first program code and (ii) a first amount of computing resources to be allocated for the execution of the first program code; determining that a first virtual machine instance of a plurality of virtual machine instances includes the first program code and includes at least the first amount of computing resources; and executing the first program code, using the one or more arguments, in a container created on the first virtual machine instance and having at least the first amount of computing resources.

Clause 9: The computer-implemented method of Clause 8, wherein the request does not specify the first amount of computing resources, the computer-implemented method further comprising determining the first amount of computing resources to be allocated for the execution of the first program code by accessing a resource constraint associated with the first program code.

Clause 10: The computer-implemented method of Clause 8, wherein the container on the first virtual machine instance includes the first program code at a time that the request is received.

Clause 11: The computer-implemented method of Clause 8, wherein the first virtual machine instance includes the first program code at a time that the request is received.

Clause 12: The computer-implemented method of Clause 8, further comprising storing the first program code in a code cache configured to store program codes.

Clause 13: The computer-implemented method of Clause 8, further comprising determining, based on a request volume associated with the first program code, that the container is to be kept alive even after the execution of the first program code has been completed.

Clause 14: The computer-implemented method of Clause 8, further comprising searching for an identifier (ID) value associated with the first program code in a plurality of virtual machine instances.

Clause 15: Non-transitory physical computer storage storing computer-executable instructions that, when executed by one or more computing devices, configure the one or more computing devices to: receive a request to execute a first program code, the request indicative of (i) one or more arguments to be used for the execution of the first program code and (ii) a first amount of computing resources to be allocated for the execution of the first program code; determine that a first virtual machine instance of a plurality of virtual machine instances includes the first program code and includes at least the first amount of computing resources; and cause the first program code to be executed, using the one or more arguments, in a container created on the first virtual machine instance and having at least the first amount of computing resources.

Clause 16: The non-transitory physical computer storage of Clause 15, wherein the request does not specify the first amount of computing resources, and the computer-executable instructions further cause the one or more hardware computing devices to determine the first amount of computing resources to be allocated for the execution of the first program code by accessing a resource constraint associated with the first program code.

Clause 17: The non-transitory physical computer storage of Clause 15, wherein at least one of the first virtual machine instance or the container on the first virtual machine instance includes the first program code at a time that the request is received.

Clause 18: The non-transitory physical computer storage of Clause 15, wherein the computer-executable instructions further cause the one or more hardware computing devices to store the first program code in a code cache configured to store program codes.

Clause 19: The non-transitory physical computer storage of Clause 15, wherein the computer-executable instructions further cause the one or more hardware computing devices to determine, based on a request volume associated with the first program code, that the container is to be kept alive even after the execution of the first program code has been completed.

Clause 20: The non-transitory physical computer storage of Clause 15, wherein the computer-executable instructions further cause the one or more hardware computing devices to search for an identifier (ID) value associated with the first program code in a plurality of virtual machine instances.

Other Considerations

It will be appreciated by those skilled in the art and others that all of the functions described in this disclosure may be embodied in software executed by one or more physical processors of the disclosed components and mobile communication devices. The software may be persistently stored in any type of non-volatile storage.

Conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Any process descriptions, elements, or blocks in the flow diagrams described herein and/or depicted in the attached figures should be understood as potentially representing modules, segments, or portions of code which include one or more executable instructions for implementing specific logical functions or steps in the process. Alternate implementations are included within the scope of the embodiments described herein in which elements or functions may be deleted, executed out of order from that shown or discussed, including substantially concurrently or in reverse order, depending on the functionality involved, as would be understood by those skilled in the art. It will further be appreciated that the data and/or components described above may be stored on a computer-readable medium and loaded into memory of the computing device using a drive mechanism associated with a computer readable storage medium storing the computer executable components such as a CD-ROM, DVD-ROM, or network interface. Further, the component and/or data can be included in a single device or distributed in any manner. Accordingly, general purpose computing devices may be configured to implement the processes, algorithms, and methodology of the present disclosure with the processing and/or execution of the various data and/or components described above.

It should be emphasized that many variations and modifications may be made to the above-described embodiments, the elements of which are to be understood as being among other acceptable examples. All such modifications and variations are intended to be included herein within the scope of this disclosure and protected by the following claims.

What is claimed is:

1. A computer-implemented method, as implemented by one or more computing devices configured with specific executable instructions, comprising:
   registering a program code associated with a user for future execution;
   receiving a code execution request to execute the program code registered for future execution, wherein the code execution request is associated with information to be used for executing the user code;
   identifying, based on the code execution request, the program code whose execution is requested, wherein, in response to the code execution request being received, the identified program code is to be downloaded and executed;
   identifying, based on the code execution request, an instance usable to execute the program code thereon;
   assigning the instance to the user for executing the program code associated with the user using the information associated with the code execution request;
   downloading the program code from a data store onto the instance assigned to the user; and
   executing the program code associated with the user on the instance assigned to the user.

2. The computer-implemented method of claim 1, wherein a resource-level constraint associated with the program code is defined prior to the receipt of the code execution request.

3. The computer-implemented method of claim 1, wherein a programming language associated with the program code is defined prior to the receipt of the code execution request.

4. The computer-implemented method of claim 1, wherein the code execution request is a Hypertext Transfer Protocol (HTTP) request.

5. The computer-implemented method of claim 1, wherein the code execution request is sent via a command-line interface (CLI).

6. The computer-implemented method of claim 1, wherein the code execution request is sent by an event service in response to an occurrence of an event.

7. The computer-implemented method of claim 1, wherein the code execution request is generated according to a time-based schedule.

8. The computer-implemented method of claim 1, wherein the code execution request is received from a user computing device.

9. The computer-implemented method of claim 1, wherein the code execution request is received from a service different from a user computing device.

10. A system, comprising:
    one or more processors; and
    one or more memories having stored thereon instructions, which, when executed by the one or more processors, cause the one or more processors to:
       register a program code associated with a user for future execution;
       receive a code execution request to execute the program code registered for future execution, wherein the code execution request is associated with information to be used for executing the user code;
       identify, based on the code execution request, the program code whose execution is requested, wherein, in response to the code execution request being received, the identified program code is to be downloaded and executed;
       identify, based on the code execution request, an instance usable to execute the program code thereon;
       assign the instance to the user for executing the program code associated with the user using the information associated with the code execution request;
       cause the program code to be downloaded from a data store onto the instance assigned to the user; and
       cause the program code associated with the user to be executed on the instance assigned to the user.

11. The system of claim 10, wherein the code execution request is a Hypertext Transfer Protocol (HTTP) request.

12. The system of claim 10, wherein the code execution request is sent via a command-line interface (CLI).

13. The system of claim 10, wherein the code execution request is sent by an event service in response to an occurrence of an event.

14. The system of claim 10, wherein the code execution request is received from a user computing device.

15. Non-transitory physical computer storage storing specific executable instructions that, when executed by one or more computing devices, configure the one or more computing devices to:
    register a program code associated with a user for future execution;
    receive a code execution request to execute the program code registered for future execution, wherein the code execution request is associated with information to be used for executing the user code;
    identify, based on the code execution request, the program code whose execution is requested, wherein, in response to the code execution request being received, the identified program code is to be downloaded and executed;
    identify, based on the code execution request, instance usable to execute the program code thereon;
    assign the instance to the user for executing the program code associated with the user using the information associated with the code execution request;
    cause the program code to be downloaded from a data store onto the instance assigned to the user; and
    cause the program code associated with the user to be executed on the instance assigned to the user.

16. The non-transitory physical computer storage of claim 15, wherein the code execution request is a Hypertext Transfer Protocol (HTTP) request.

17. The non-transitory physical computer storage of claim 15, wherein the code execution request is sent via a command-line interface (CLI).

18. The non-transitory physical computer storage of claim 15, wherein the code execution request is sent by an event service in response to an occurrence of an event.

19. The non-transitory physical computer storage of claim 15, wherein the code execution request is generated according to a time-based schedule.

20. The non-transitory physical computer storage of claim 15, wherein the code execution request is received from a user computing device.

* * * * *